(12) United States Patent
Fauteck et al.

(10) Patent No.: US 9,772,836 B2
(45) Date of Patent: Sep. 26, 2017

(54) DELIVERY OF CORRECTION PACKAGES

(71) Applicants: Jens Fauteck, Sinsheim (DE); Hans-Ludwig Schneider, Schwetzingen (DE); Matthias Schuler, Waldbrunn (DE); Dirk Ganzke, Reilingen (DE); Mario Lein, Mannheim (DE); Sudeep Kumar Das, Bangalore (IN)

(72) Inventors: Jens Fauteck, Sinsheim (DE); Hans-Ludwig Schneider, Schwetzingen (DE); Matthias Schuler, Waldbrunn (DE); Dirk Ganzke, Reilingen (DE); Mario Lein, Mannheim (DE); Sudeep Kumar Das, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/574,566

(22) Filed: Dec. 18, 2014

(65) Prior Publication Data
US 2016/0179496 A1    Jun. 23, 2016

(51) Int. Cl.
G06F 9/44       (2006.01)
G06F 9/445      (2006.01)
G06F 11/36      (2006.01)

(52) U.S. Cl.
CPC .......... *G06F 8/65* (2013.01); *G06F 8/66* (2013.01); *G06F 11/3668* (2013.01); *G06F 11/3672* (2013.01); *G06F 8/665* (2013.01); *G06F 8/67* (2013.01)

(58) Field of Classification Search
CPC ............................................ G06F 8/60–8/77
See application file for complete search history.

(56) References Cited

U.S. PATENT DOCUMENTS

| | | | |
|---|---|---|---|
| 8,752,044 B2* | 6/2014 | Motta | G06F 8/65 717/174 |
| 8,825,817 B1* | 9/2014 | Jaisinghani | H04L 41/0816 709/221 |
| 8,850,420 B2* | 9/2014 | Yousouf | G06F 8/65 709/219 |
| 9,098,375 B2* | 8/2015 | Narkinsky | G06F 8/65 |
| 9,383,984 B2* | 7/2016 | Mantripragada | G06F 8/60 |
| 2007/0203953 A1* | 8/2007 | Damodhar | G06F 8/65 |
| 2008/0028395 A1* | 1/2008 | Motta | G06F 8/65 717/177 |

(Continued)

OTHER PUBLICATIONS

LaMantia, Matthew J., "Dependency Models as a Basis for Analyzing Software Product Platform Modularity: A Case Study in Strategic Software Design Rationalization," 2006, pp. 1-131.*

(Continued)

*Primary Examiner* — Thuy Dao
*Assistant Examiner* — Christopher Franco
(74) *Attorney, Agent, or Firm* — Mintz Levin Cohn Ferris Glovsky and Popeo, P.C.

(57) ABSTRACT

A system, a method, and a computer-program product for delivering of correction packages are disclosed. At least one correction instruction is generated based on at least one correction to a software application. At least one correction package is assembled and linked to the generated correction instruction. The assembled correction package is transported to the software application for applying to the software application.

14 Claims, 17 Drawing Sheets

(56) References Cited

U.S. PATENT DOCUMENTS

| | | | | | |
|---|---|---|---|---|---|
| 2010/0257517 | A1* | 10/2010 | Sriram | | G06F 8/68 717/168 |
| 2011/0138374 | A1* | 6/2011 | Pal | | G06F 8/67 717/169 |
| 2012/0174087 | A1* | 7/2012 | Bentzien | | G06F 8/65 717/169 |
| 2013/0254755 | A1* | 9/2013 | Yousouf | | G06F 8/60 717/170 |
| 2014/0047426 | A1* | 2/2014 | Raje | | G06F 8/65 717/168 |
| 2014/0237463 | A1* | 8/2014 | Sriram | | G06F 8/65 717/172 |
| 2014/0359593 | A1* | 12/2014 | Cohen | | G06F 8/65 717/169 |
| 2015/0113516 | A1* | 4/2015 | Bennah | | G06F 8/65 717/170 |
| 2015/0154233 | A1* | 6/2015 | Lightner | | G06F 8/61 714/32 |
| 2015/0178063 | A1* | 6/2015 | Narkinsky | | G06F 8/68 717/168 |
| 2015/0378712 | A1* | 12/2015 | Cameron | | G06F 8/65 717/169 |
| 2015/0378713 | A1* | 12/2015 | Powell | | G06F 8/70 717/169 |

OTHER PUBLICATIONS

LaBelle, Nathan, et al., "Inter-package dependency networks in open-source software," 2004, pp. 1-6.*

Nivre, Joakim et al., "MaltParser: A Data-Driven Parser-Generator for Dependency Parsing," 2006, pp. 2216-2219.*

Cox, Lisa, et al., "Dependency Analysis Using Conceptual Graphs," 2001, pp. 117-130.*

Bloemen, Remco et al., "Gentoo Package Dependencies over Time," Jun. 2014, pp. 404-407.*

Bellur, Umesh et al., "A Methodology & Tool for Determining Inter-component Dependencies Dynamically in J2EE Environments," 2007, pp. 1-8.*

* cited by examiner

DELIVERY OF CORRECTION PACKAGES

TECHNICAL FIELD

This disclosure relates generally to data processing and, in particular, to delivery of correction packages as part of software maintenance.

BACKGROUND

Software applications provide companies with an ability to efficiently and effectively conduct their businesses. Software applications deal with various aspects of companies' businesses, including finances, product development, human resources, customer service, management, and many other aspects. During their lifecycles, software applications can undergo a multitude of updates and/or corrections. Some of these updates/corrections may be required to accommodate changing needs of the companies, updates to other software applications, changes in operating systems that companies employ, as well as for any other reasons.

Typically, vendors of software applications may provide support and/or maintenance services to the companies to ensure that the software applications are running smoothly and/or up-to-date. As part of the support/maintenance, vendors can provide companies with regular and/or automatic updates/corrections to the software applications. The updates/corrections can be installed by the vendors and/or supplied to the companies for installation by appropriate company technicians. However, conventional systems and/or methods of providing updates to software applications can be cumbersome and/or slow and can depend on the type, size, etc. of the update/correction to the software application. This can cause an increase in costs, a reduced productivity, loss of profits, etc. associated with use, operation, and/or maintenance of the software applications as well as the entire company business. Thus, there is a need for an efficient way of delivering updates, maintenances, correction, etc. to software applications.

SUMMARY

In some implementations, the current subject matter relates to a computer-implemented method for delivering of correction packages. The method can include generating at least one correction instruction based on at least one correction to a software application, assembling at least one correction package, and linking the assembled at least one correction package to the generated at least one correction instruction, and transporting the assembled correction package to the software application for applying to the software application. At least one of the generating, the assembling, and the transporting can be performed by at least one processor of at least one computing system.

In some implementations, the current subject matter can include one or more of the following optional features. The correction package can include a plurality of corrections and corresponding correction instruction metadata. At least one correction instruction can be dependent on at least another correction instruction using at least one dependency. The dependency can include at least one of the following: a correction instruction being dependent on another correction instruction, a correction instruction being dependent on an external requirement of the software application, and a correction being dependent on at least one required correction for the software application In some implementations, the dependency can be determined by identifying a transport order included in at least one support package for the software application, identifying at least one correction request for the software application for inclusion in the correction package, and identifying at least one technically and/or functionally connected correction instruction.

In some implementations, the method can further include receiving a request for assembling the correction package from the software application, performing the assembling of the correction package, testing the assembled correction package, and releasing, based on the testing, the assembled correction packages for applying to the software application.

In some implementations, the correction package is assembled using an advanced business application programming.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter provide methods, systems, articles or manufacture, and the like that can, among other possible advantages, provide systems and methods for delivery of correction packages as part of software maintenance.

Figure 1:
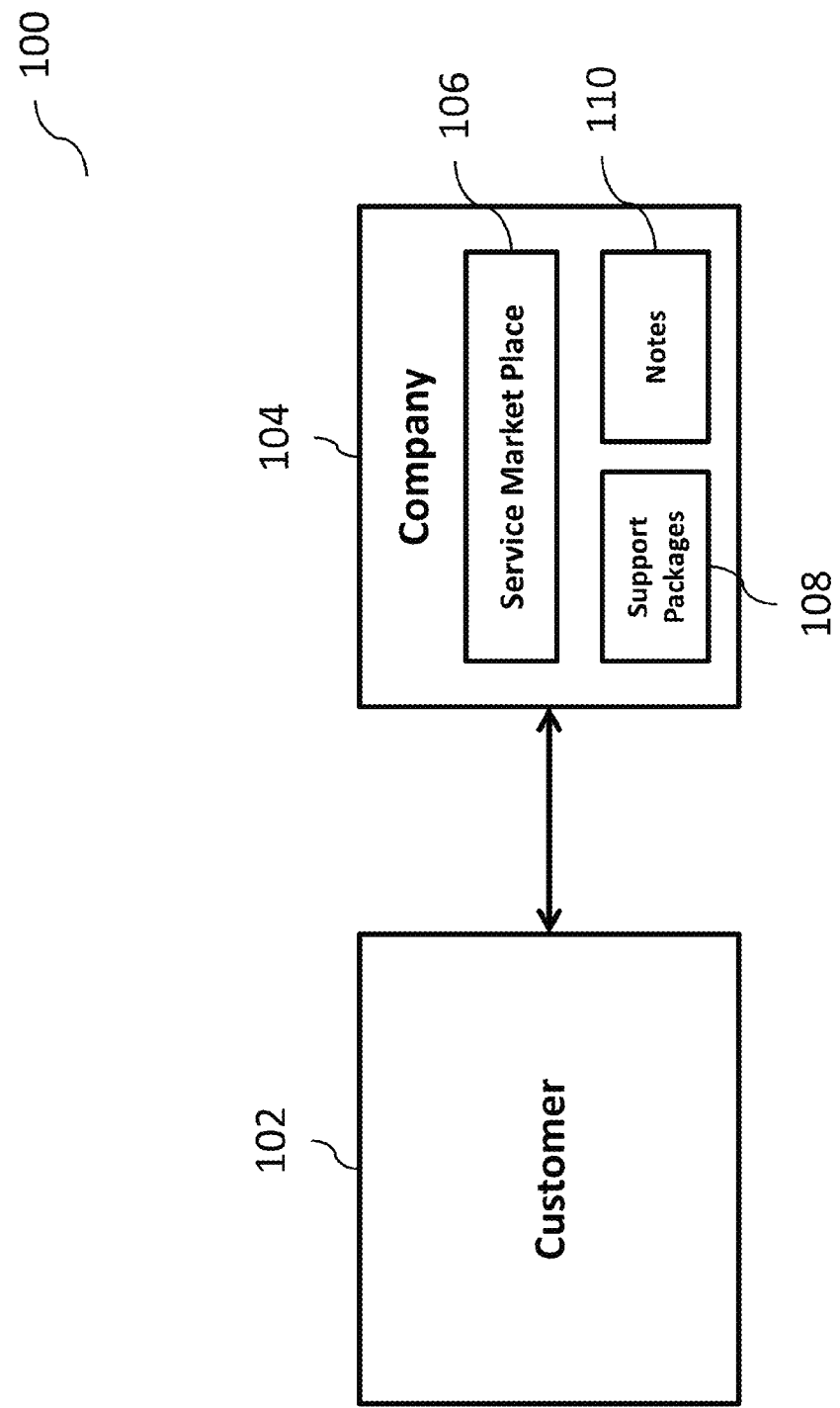
FIG. 1 illustrates an exemplary system that can allow communication between a customer and a company, according to some implementations of the current subject matter.

In some implementations, the current subject matter can be implemented in an exemplary system 100 that can allow communication between a customer 102 and a company 104, as shown in FIG. 1. The company 104 can provide various software, services, and/or other products to the customer 102. The company 104 can includes a service market place component 106 through which it can offer its customers such software, services, and/or products. The company 104 can also provide various support packages 108 and notes 110 (e.g., SAP Note as available from SAP SE, Walldorf, Germany) to its customers. In some implementations, a support package 108 can include various corrections for software, services, and/or products that can be offered by the company 104 through its service market place 106. In some implementations, the notes 110 can be a consumable package, which can be similar to the support package and can be based on a delivery transport request with a consolidated object list.

The support packages and/or correction packages can ensure proper operation of software, services and/or products that can be offered by the company 104 to its customers. The support and/or correction packages can be provided by the company 104 automatically, upon request by the customer, and/or in desired fashion. The company 104 can create support and/or correction packages based on requests from customers, reviews of its software, service and/or products, and/or in any other fashion. The support and/or correction packages can be created during development, tested, put into production, and then released to company's customers. The packages can be available for free and/or upon payment. In some implementations, the packages can be offered as part of advanced business application programming ("ABAP") software, available from SAP SE, Walldorf, Germany.

In some implementations, support and/or correction packages can be delivered in a variety of ways. The support packages and its objects can be delivered based on a transport and thus, the whole object(s) are delivered. Support packages can be delivered based on a schedule and can be produced centrally using a specific process. One of the advantages of delivering support packages this way is that the entire content (i.e., all object types) can be shipped together and applied easily. However, a high validation effort on the part of the customer as well as patching for the whole system may be required.

Corrections can be delivered using a technical object describing problems and solutions of a standard function of software. A note is linked to correction instructions that can describe technical changes of the software. An example of such note is SAP Note product, as available from SAP SE, Walldorf, Germany. In this case, correction instructions can be delivered using such note, where changes can be performed using an ABAP workbench automation. Deletion/insertion of content can be based on context blocks (i.e., patterns of already existing content) within the correction instruction. Only delta information can be provided in the correction instruction and applied at the customer site. Correction instructions can be created on demand and by development. One of the advantages of this delivery method can be ease of creation and application for small and independent correction instructions. However, complexity of implementation can grow with increasing number of corrections and/or relationships between dependent correction instructions. Further, correction instructions support only a restricted set of object types and translation might not generally be possible.

The following methodologies currently exist for providing corrections to customers' software applications. In some cases, there exist support packages for shipping all types of content, which can be easily applied, but can be highly restricted in the order and require to be applied into the whole landscape. At customer site, implementation can cause substantial validation efforts and at company site, the content may require substantial effort of translation, production and validation. In other cases, there exist correction instructions that can be delivered via a note product. These may be highly restricted from the content perspective and can support only some content types (e.g., repository objects, function modules, classes, methods, reports, etc.). Here, correction instructions might be able to carry translations and may be limited in size. At company site, correction instructions can be created by a developer with great freedom on order and scope. Small and/or nearly independent corrections can be implemented by customers very easily. The implementation can become a challenge for customers if the note includes many correction instructions with big object lists and a potential need of additional manual activities. Additionally if there are many dependencies between the notes, the implementation can be intractable for the customer.

In some implementations, the current subject matter relates to providing a correction package to a customer that can be easily implemented by the customer without requiring a substantial effort on the part of the company and/or the customer.

Figure 2:
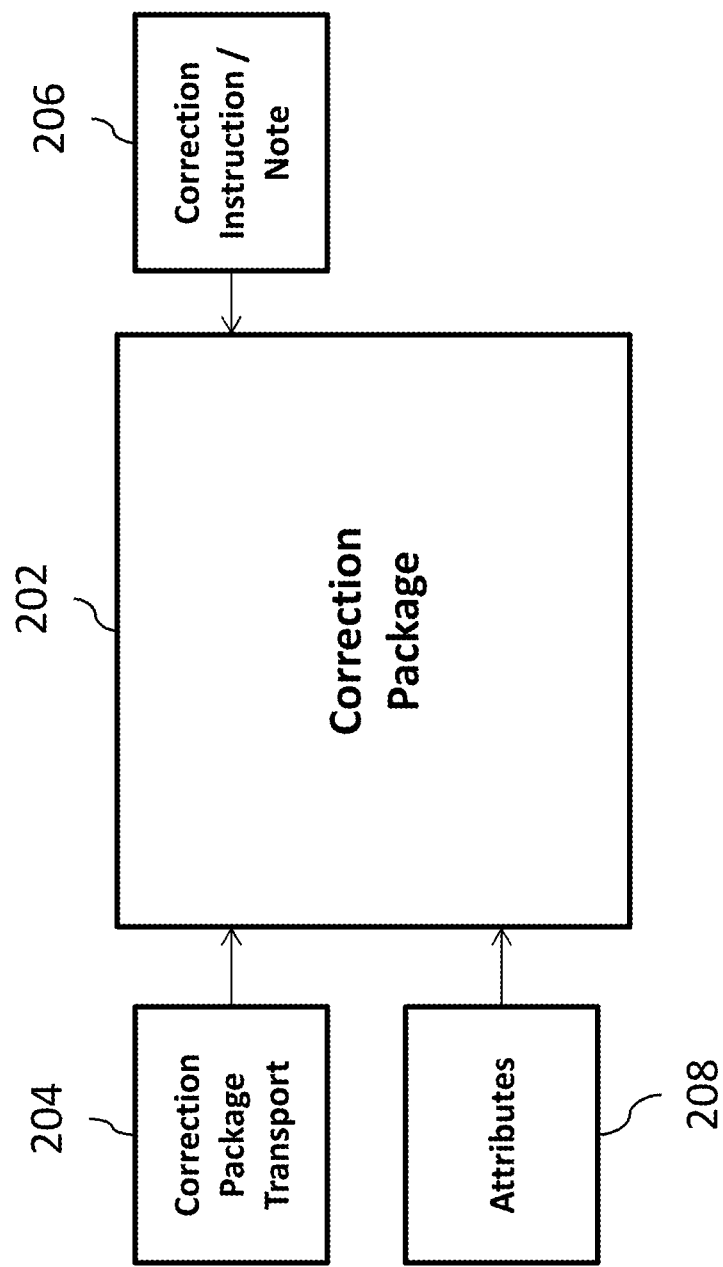
FIG. 2 illustrates an exemplary content of a correction package, according to some implementations of the current subject matter.

FIG. 2 illustrates an exemplary content of a correction package 202, according to some implementations of the current subject matter. A correction package 202 can include a correction package transport object 204, installation attributes 208 (e.g., software component version, minimal support package, languages, etc.). In some implementations, an ABAP transport object can allow delivery of all ABAP objects with a transport connection. The attributes 208 can identify the correction package and/or can avoid unintended installation. The correction package 202 can be linked to the correction instruction/note 206 that can describe the content and purpose of the correction package. In some implementations, a correction instruction can allow a customer to apply the correction package using the note assistant tool discussed above. In some implementations, a transport based correction instruction can allow reuse of the note assistant to apply correction packages, i.e., a transport based correction instruction can relate to a correction package. A correction package might include several other corrections. The instruction/note 206 can contain multiple correction instructions, e.g., to support fixes over multiple releases. Correction instructions can have dependencies to multiple other correction instructions.

Figure 3:
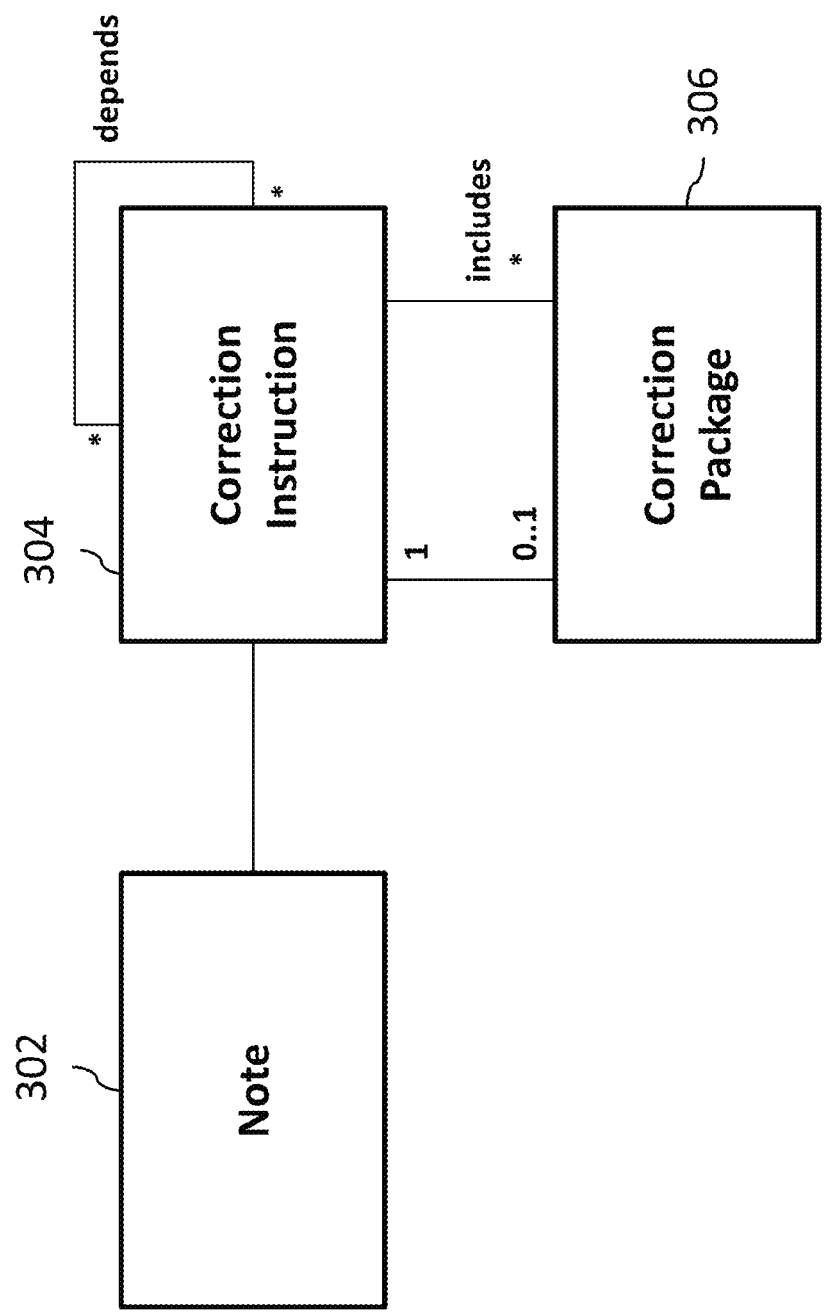
FIG. 3 illustrates an exemplary relation of correction packages and correction instructions, according to some implementations of the current subject matter.

FIG. 3 illustrates an exemplary relation of correction packages and correction instructions, according to some implementations of the current subject matter. The correction package 306 can include one or more corrections, provided by technical correction instructions 304. The correction instruction 304 can be linked to a note 302. The correction instruction 304 can be dependent on one or more other correction instructions. The correction packages can be used to provide a single correction, a set of corrections, a "latest greatest" and "language transport" corrections, as well as any other corrections. The single correction can include a specified range that considers just the objects relevant for the single correction. The set of corrections can include a specified range that considers not just the objects of this correction but also all objects changed after a starting point back in time related to an earlier support package level or other correction package. The "latest greatest" correction can include all former corrections. The language transports correction can include language objects that can be considered in the correction package.

Figure 4:
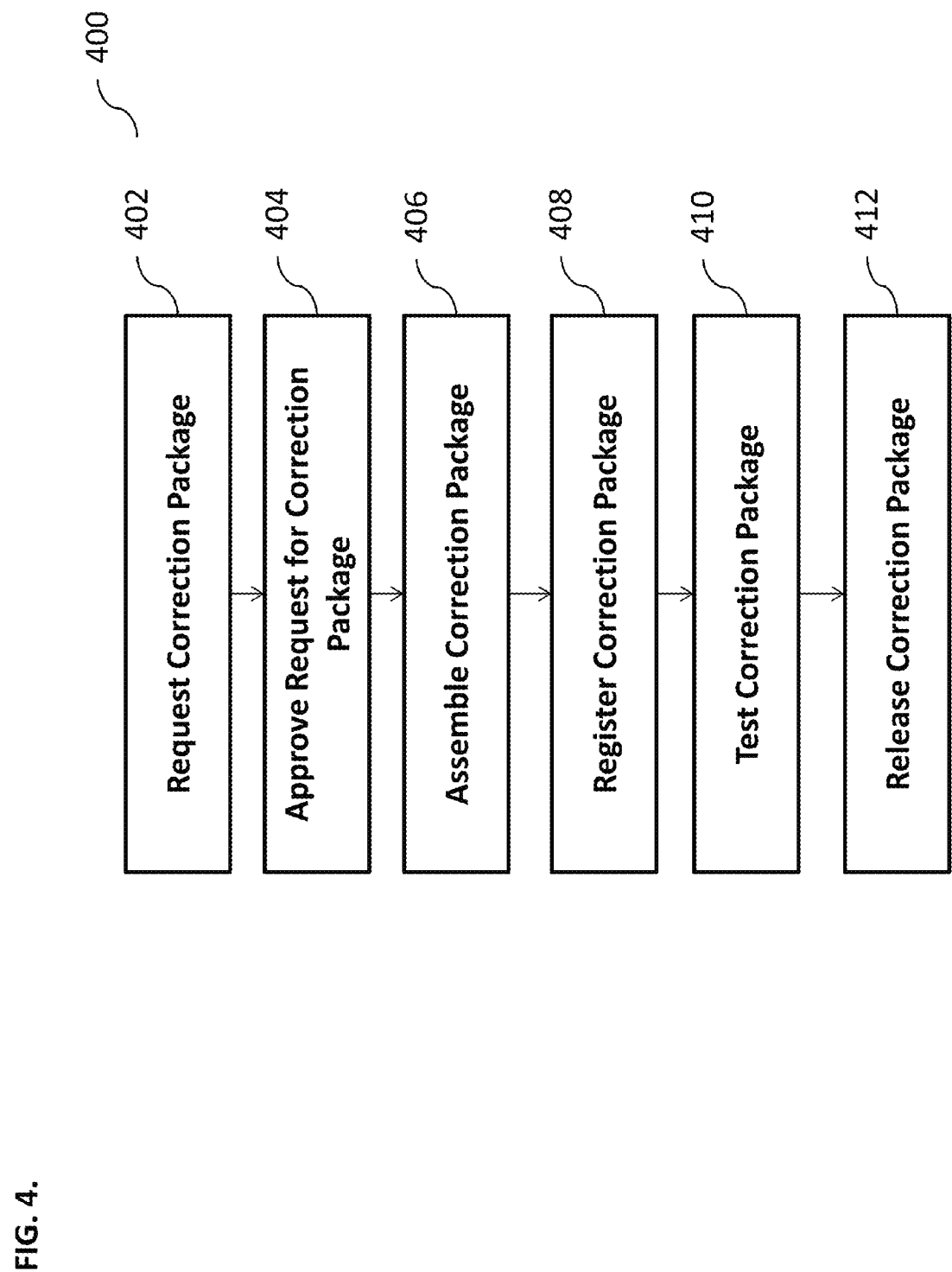
FIG. 4 illustrates an exemplary process for creating a correction package, according to some implementations of the current subject matter.

FIG. 4 illustrates an exemplary process 400 for creating a correction package, according to some implementations of the current subject matter. The correction packages can be created for implementation during different phases of software operation for which the correction package may be intended. An initial version of a correction package for the software can be created from a correction code line. In subsequent deliveries of software versions, e.g. deliveries of objects of a higher release of software, correction instructions can be issued together with correction packages. A correction instruction with an assigned correction package might not be valid for multiple software component versions. Production of a correction package can be performed in a similar manner as support packages and/or add-on releases can be assembled and/or validated. Object types can be delivered via a support package and can be part of a correction package.

Referring to FIG. 4, at 402, a request for correction package can be issued by a software application that can be running on a customer system. In some implementations, a customer can report a problem (or any other issue) with a software application that the customer may be running. The customer's report can be analyzed and/or appropriate corrections can be prepared by the company. The company can request and/or assemble a correction package to be delivered to the customer to address the reported problem. The company can also review and approve the request. Subsequent to the approval, the assembled correction package can be delivered to the customer. Referring back to FIG. 4, at 404, the request can be reviewed, considered and approved. The request can be issued to the company's customer support system ("CSS") 106 (shown in FIG. 1). The company's customer support system/service market place can perform various tests and/or validation checks and once the request is approved, an assembly of the correction package can be initiated, at 406. The assembly can include creating and/or assembling of various objects that may be needed to correct and/or upgrade customer's system and/or its various components. The objects can be data, metadata, software applications, software modules, code, and/or any other objects that may be needed to implement correction(s) at the customer site.

Once the correction package is assembled, the package can be registered at the customer support system/service market place 106 (shown in FIG. 1), at 408. The assembled package is tested, at 410. Testing can involve determination of whether the correction can be successfully implemented at the customer's site. If it cannot, the process can return to the assembly stage and further changes to the correction package can be implemented.

Upon indication of a successful testing, the correction package can be released to the customer, at 412. Once the customer has received the correction package, the correction package can be implemented at the customer's system.

Figure 5:
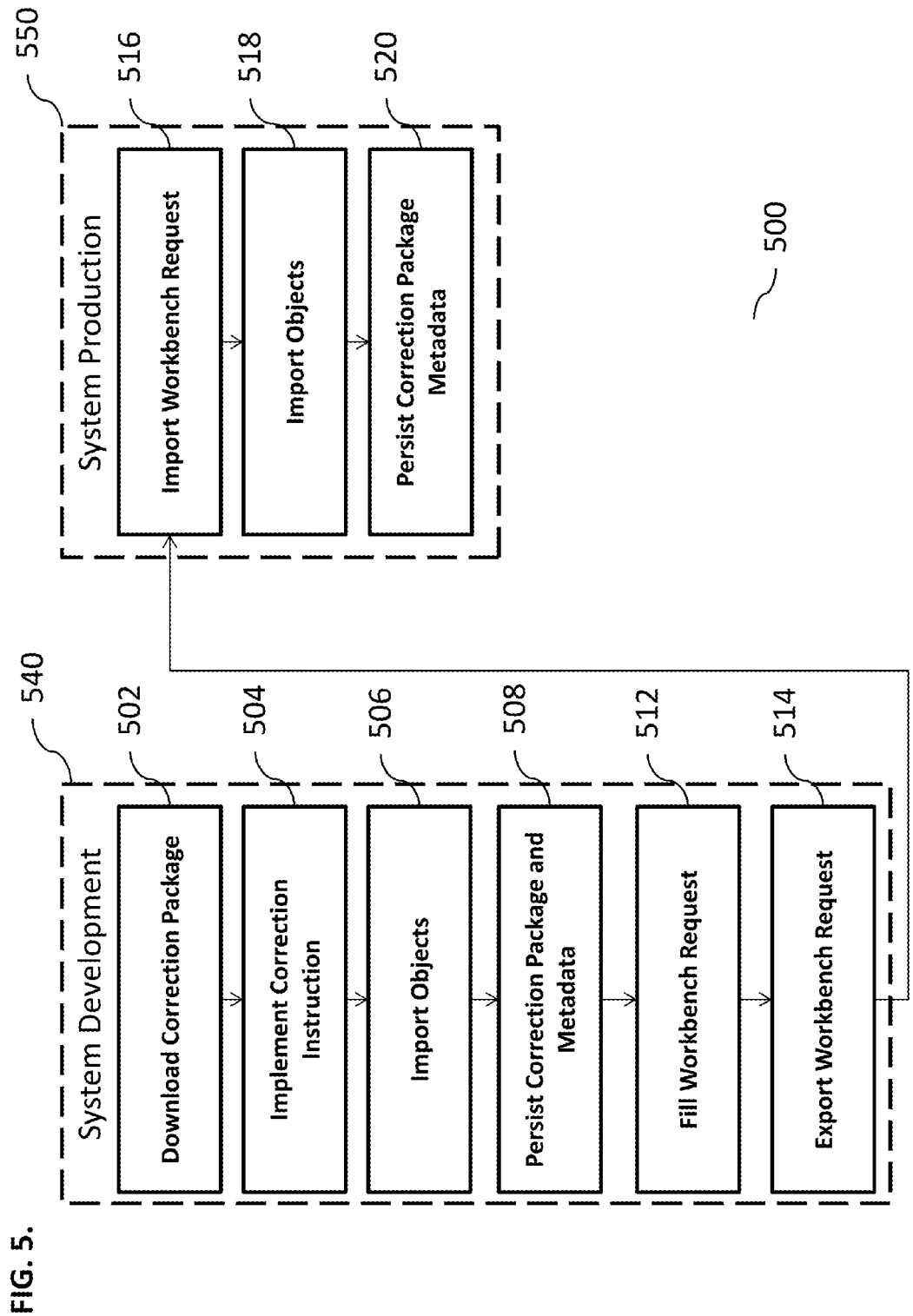
FIG. 5 illustrates an exemplary process for consumption of a correction package, according to some implementations of the current subject matter.

FIG. 5 illustrates an exemplary process 500 for consumption of a correction package, according to some implementations of the current subject matter. The consumption process can involve creation of the correction package based on various requirements of customer's software and/or system that may be known and/or that can be received specifically from the customer and/or obtained in any other fashion. The consumption process 500 can be implemented by the company 104 (shown in FIG. 1) in two stages: at a development system stage 540 and at a production system stage 550.

In the development stage 540, a correction package can be downloaded, at 502. This can involve downloading of notes, correction packages, correction instructions, etc. from service market place 106 (as shown in FIG. 1). Notes and/or correction instructions can be implemented during development, at 504. Additionally, any correction package metadata objects (e.g., note information, correction instruction information, etc.) can be imported, at 506. At 508, the imported metadata object and the correction package can be persisted in memory that can be associated with the company's system (and/or its service market place). Any modification information that can be related to any changes made by the customer and/or company associated with the software can also be written into memory. Thus, a complete correction package can be completely persisted in memory, which can avoid keeping the created correction package in a transport directory of the service market place of the company. The stored correction package can be later changed, if so required.

Once the correction package has been stored, a workbench request can be filled, at 512, and exported by the development system 540 to the production system 550, at 514. This can allow the production system 550 to receive information about the correction package to be released to the customer. The created workbench can be imported by the production system 550 from the development system 540, at 516. Any objects that may be associated with the correction package can be imported, at 518. The metadata associated with the correction package can be stored in memory, at 520, along with any modification information for the objects associated with the correction package. Once the process 500 completes, the metadata and/or objects associated with the correction package and the correction package can be provided to the customer.

Figure 6:
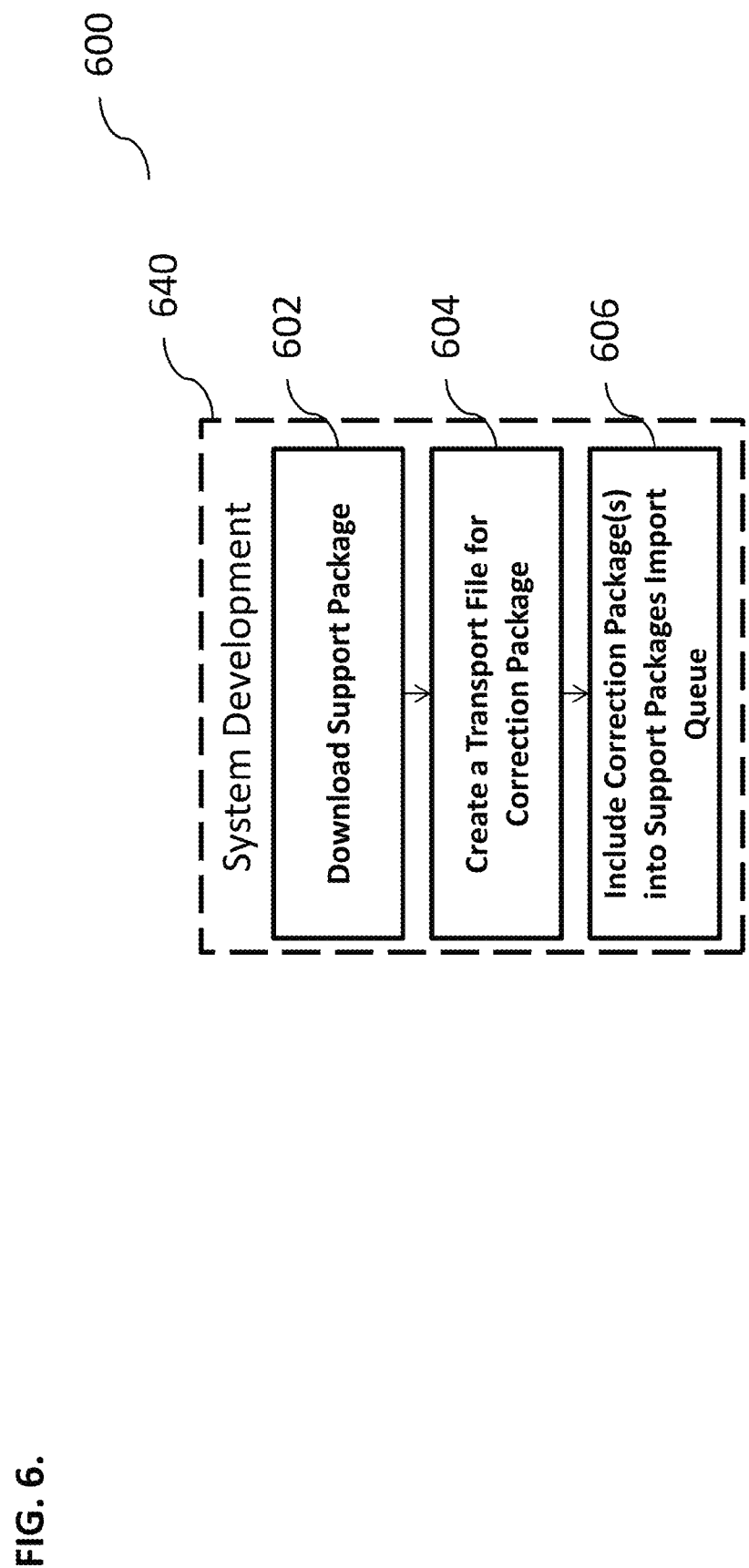
FIG. 6 illustrates an exemplary adjustment process of a correction package subsequent to the implementation of a support package, according to some implementations of the current subject matter.

In some implementations, correction packages may need to be adjusted and/or modified as a result of conflict checks and/or any other inconsistencies that may arise. Such conflicts/inconsistencies can arise as a result of a deployment of a support package to the customer. FIG. 6 illustrates an exemplary adjustment process 600 of a correction package subsequent to the implementation of a support package, according to some implementations of the current subject matter. The adjustment process 600 can occur in the development system 640. At 602, a support package can be downloaded, and a transport file can be created for the correction package to be modified, at 604. The correction package can be included in to support package's import queue, at 606. Various information, including objects, correction package metadata, modification information, etc., can be included along with the correction package. Once the correction packages and the above information are queued for importation, they can be exported to the production system. Eventually, this data can be transported to and implemented at the customer site. In some implementations, this process can be re-executed in the system production phase.

Figure 7:
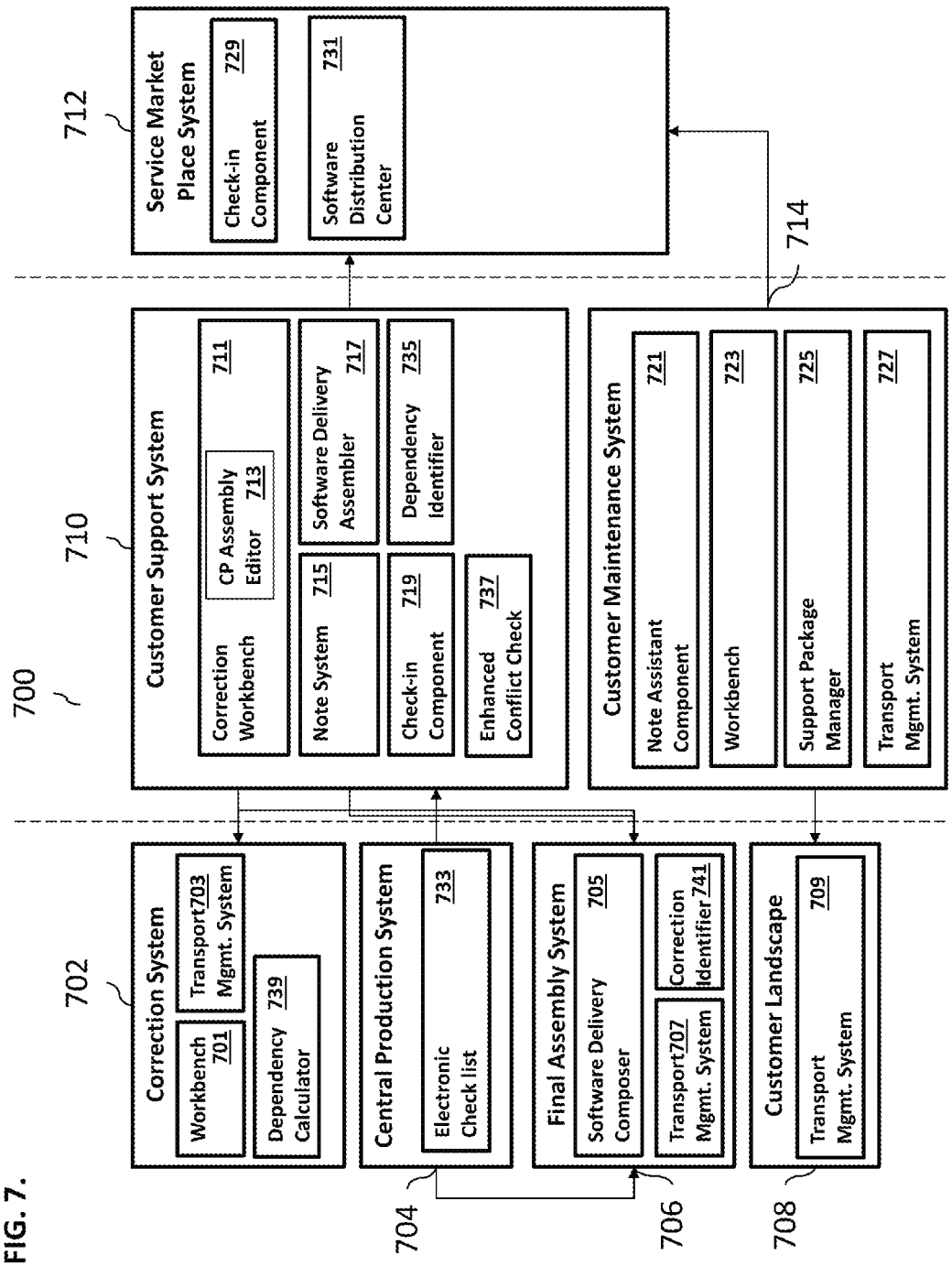
FIG. 7 illustrates an exemplary system for assembly, delivery and importation of a correction package to a customer, according to some implementations of the current subject matter.

FIG. 7 illustrates an exemplary system 700 for assembly, delivery and importation of a correction package to a customer, according to some implementations of the current subject matter. The system 700 can include a correction system 702, a central production system 704, a final assembly system 706, a customer landscape system 708, a customer support system 710, a service market place system 712, and a customer maintenance system 714.

The company's customer support system 710 can provide company's customers with an ability to obtain support, including obtaining correction packages for the software that has been obtained by the customer from the service market place system 712. The customer support system 710 can be communicatively coupled to the correction system 702, the central production system 704, the final assembly system 706 and the customer landscape system 708 for receiving information, data, metadata, objects, correction packages, support packages, etc. associated with the software that the customer obtained from the service market place system 712. Each of the systems shown in FIG. 7 is discussed in more detail below.

In some implementations, the customer support system 710 can include a correction workbench computing environment 711 that can be used to create a corrective measure, a correction request, and/or a correction instruction. The correction package creation process, dependency calculation can begin in the correction workbench 711. The customer support system 710 can also include a correction package request editor 713 that can assemble a correction package. The correction package request can contain information needed for the package assembly. The system 710 can further include software delivery assembler component 717 that can be used to create the correction package that can contain a data file of a delivery request, which can include a block of meta information (e.g., software component data, import conditions, extended package attributes) for its consumption by customers. The customer service system 710 can further include a note system 715 (such as an SAP Note product, as available from SAP SE, Walldorf, Germany) that can include one or more corrections and corresponding correction instruction metadata and a description of the correction. The software delivery assembler component 717 can communicate with the final assembly system 706, which can include a software delivery composer component 705 that can be used to create a delivery request with all objects needed for a correction package. The system 710 can further include a check-in component 719 that can be used to publish correction packages in the service market place system 712 along with a corresponding check-in component 729, which can allow downloading of the correction packages by the customer(s).

In some implementations, the service market place system 712 can provide company's customers with an ability to obtain various software application, products and/or services, as well as any correction packages. The customer maintenance system 714 can communicate with the service market place system 712 to obtain the software products, applications, etc. as well as correction and/or support packages. The company's customer maintenance system 714 can provide the customer with support packages for the software as well as various maintenance options for the software. If the customer requires a correction, the customer can download a note with correction instructions and/or correction packages via a software distribution center 731 that can be included in the service market place system 712. A note assistant component 721 can assist the customer with implementation of correction instructions and correction packages on the customer system. During implementation of the correction, a workbench 723 order can be created in order to record all changes, where the changes can be transported through the customer landscape system 708. The workbench requests can contain all metadata of the notes, correction instructions and/or correction packages. A support package manager component 725 that can be included in the customer system 714 and can perform implementation of correction instructions with correction packages. The customer system 714 can further include a note assistant component 721 (such as an SAP Note product, as available from SAP SE, Walldorf, Germany) that can include one or more correction instructions and a description of the correction.

In some implementations, the customer support system 710 along with other components/systems shown in FIG. 7 can perform production of correction packages, including integration of the correction package assembly into the correction process by corrective measures, approval process of the correction package integration, calculation of prerequisites corrections and assembly and delivery of correction packages to the customer. The following is a discussion of the system 710's components that can be involved in performing the above functionalities.

In some implementations, the correction workbench component 711 can include a corrective measure monitor component, using which the developer can create a correction request, a correction instruction, a note and a request for the correction package. These objects can then be edited by corresponding editor components that can be included in the workbench 711. The correction workbench 711 can also store data such as software component versions, package reservation data, and/or any other correction workbench data.

In some implementations, the correction package assembly request editor 713 can be used to request a correction package in a correction package request ("CP Request"), where the correction package can be linked to a new type of correction instruction, the transport based correction instruction. Using this request, an approval process can be applied for the correction package assembly. The request can collect necessary information that may be needed for the correction package assembly (e.g., release data, validity of package levels [min, max], language information, etc.). The editor 713 can also include a status indicator with regard to its process, where the status can be at least one of the following:

in-process, to be approved, approved: approval rejected, in assembly, for functional testing, and released.

In some implementation, the system 700 can also include workbench components (e.g., ABAP Workbench, as available from SAP SE, Walldorf, Germany) 701 (in correction system 702) and 723 (in customer system 714) as well as transport management components 703 (in correction system 702), 707 (in final assembly system 706), 709 (in customer landscape 708), and 727 (in customer system 714). The workbench components allow users (e.g., developer, customer users, etc.) to make various changes to various software objects. The transport management system components can allow providing or transporting of components, objects, etc. from one system to another. Further, the workbench 701 and transport management 703 components in the correction system 702 can provide an environment where a developer can make changes on various repository objects, where the changes can be recorded within a transport request.

In some implementations, the central production system 704 can include an electronic check list component 733 which can be a central assembly tool that can coordinate package assembly with a software delivery composer ("SDC") 705 in the final assembly system 706, software delivery assembler ("SDA") 717 in the customer support system 710, server pooling and import test activities, etc. One of the new assembly steps can include collection of data of an approved correction package request (e.g., object list, transport request, correction package data, software component version data, etc.). In some implementations, the software delivery composer 705 can create a delivery order with a list of repository objects. The object list can be a result of a set of imported transport requests. The object list can be checked by various technical checks. If the object list passes the checks, the delivery request can be released and a transport data file can be created within the transport management system. The software delivery assembler 717 can create a patch file which can include transport data file from the final assembly system 704 (e.g., export data file, language vector, etc.), meta information from the correction workbench 711 and information from product and production management system ("PPMS") (which is a central knowledge repository for technical information on software components, products, etc.). It can also include additional information by extended package attributes that may be necessary for a consistent deployment on a customer system.

In some implementations, the note system 715 can create a note and link it to the correction instruction. The note can inform the customer about a problem and a solution for the problem. For the correction package, the note and correction data with the validity data can be stored into a separate data file. This data file can be available for the check-in component 719 of the system 710.

In some implementations, a correction package can be created using the correction system 702 and the customer support system 710, as shown in FIG. 7. The creation process can be initiated using the correction workbench 711. A corrective measure can be created using the correction request/workbench request in the correction system 702. Afterwards, the correction can be performed in the correction system 702 and changes can be recorded into a transport request using the transport management system 703. The task in the transport system 703 can then be released and the correction request can be released after a note is formally assigned within the corrective measure. For further processing, the correction request can be sent to a tester (e.g., another user of the system 700) for the correction solution. This test can be performed in the correction system 702 and/or in a test system where a generated test transport has been transported. If the tester does not find any problems with the correction, the correction request can be set on "Tested with ok" status and a corresponding transport request in the correction system can be released. The export data file can now be ready for further imports. At this point, correction instructions can be created and can be assigned to the note in order to make correction available to the customer.

In the case of an ABAP correction package, the process can continue in a different direction, where the next step can include package assembly by the add-on factory. Before starting the assembly activities, the correction package request may need to be approved. To approve the correction package, a correction package request can be created where necessary data for package assembly can be included (e.g., software component version, validity of the correction, required languages, etc.). Then, the list of corrections that are relevant for the package can be determined and transported using transports. The transports can then be imported into a consolidation system, so that translations can be performed for the objects of these transports, if so required. The correction package can be reserved in the correction workbench 711 and can be linked to the correction instruction and a note. The assembly can start after a trigger for the assembly group. This trigger can be an internal message on a defined component. From the central production assembly system, all the data stored in the correction package request can be collected. After finishing the assembly of the correction package, the correction can be validated by note implementation tests. The correction can now be handed over to a function test by testers of the corresponding application component. If all tests have been passed successfully, the correction instruction and the note can be released so that the correction package can be made available to the customer.

In some implementations, an internal message can be created based on the corrective measure monitor on a proper application component. It is the official confirmation that the assembly of a correction package can now be started. The request can store all data in a format which can enable an electronic check list 733 to retrieve data that can be necessary for the assembly steps for the correction package. The prerequisite for the assembly can be a provision of a separate correction package assembly system. The following preparation processes can be implemented for the package assembly: import of the latest support packages into an extra final assembly system for correction packages and import of all necessary transports from the correction system, based on the last support package. The assembly steps, starting with the creation and composing of the delivery and delivery request (with reserved package name from the correction workbench) can be performed using software delivery composer 705. These are the activities in the CP final assembly system.

In some implementations, the production process of the correction package can be initiated at the customer support system 710 by creating a corrective measure. Once the measure is created, it is passed to the central production system 704, which can import requisite data associated with the corrective measure. Additionally, a support package data can be imported into the correction package being assembled by the final assembly system 706. Using transport management system components 703 and 707, this data can be imported into the final assembly system 706.

At the final assembly system 706, a delivery transport object can be created for the correction package. The delivery transport object can include all objects from the correction package request. A consistency check of data of these objects can be performed and any inconsistent data can be deleted and/or corrected. The final assembly system 706 can also perform compatibility check, an object list check, translations that may be requested, etc. Once these processes are completed, the final assembly system 706 can create export data file for delivery request of the correction package and pass it to the customer support system 710.

The customer support system 710 can register correction package and perform a check-in procedure to include a note data file, using check-in component 709. Subsequently, a test can be performed using a note assistant of the central production system 704. Upon successful completion of the tests, the central production system 704 can provide an appropriate indication to the customer support system 710, which can determine that the correction package can be released pending an appropriate indication from the final assembly system 706. Once the final assembly system 706 indicates that correction package can be released, the customer support system 710 can release a correction instruction and a note.

In some implementations, once the correction package is released by the customer support system 710, the package can be consumed by the customer system 714. The following components can be used to perform the consumption of the correction package.

In some implementations, the note assistant component 721 can be a tool for customers that can assist them in implementing notes (e.g., SAP Note product, as available from SAP SE, Walldorf, Germany) on the system. First, the note file with the correction package can be downloaded from the service market place 712 into a file system of the customer system 714. From the downloaded file, the data can be uploaded into customer system's database tables. During implementation of the note, a consistent correction instruction queue can be calculated and validity of the correction instructions can be used. An implementation manager of note assistant 721 can implement changes within the workbench 723 and/or start an import of the correction packages using an import manager of the support package manager 725. All changes can be recorded within a workbench request, created in the transport management system 727.

In some implementations, the support package manager 725 can be a tool for customers that can assist in importation of support/correction packages on the customer system 714. The import manager of the support package manager 725 can be used to import correction packages during note implementation. The customer has an opportunity to import support packages. The support packages potentially can overwrite implemented corrections. In this case, a determination can be made whether a correction package has to be included within the import queue. Thus, the queue calculator can call a correction instruction validation checker in order to find out whether the correction package is still valid on the new support package level.

In some implementations, all changes on repository objects can be recorded using the note assistant 721 within the transport requests on a development system. After finishing the correction activities, the requests can then be imported into the customer landscape 708.

To implement a correction package, a note file with correction package can be downloaded and the note assistant component 721 in the customer system 714 can be initiated. Subsequently, the note file can be selected. Alternatively, the order of these processes can be changed, whereby the note assistant component 721 can be initiated and a note containing correction package can be selected and downloaded. Subsequently, any prerequisite notes can be downloaded and a correction instruction queue can be generated by the note assistant component 721. Then, the note assistant component 721 can implement the corrections in the instructions queue. The corrections can be performed manually and/or automatically, recorded into a transport request, and any changed objects can be activated. If correction packages are to be implemented, the support package manager 725 can import such correction packages, record transport requests, and activate changed objects. Once the above processes for a particular instruction in the queue are completed, the instruction queue can be checked again to determine whether further corrections are necessary. If so, the process can be repeated.

In some implementations, a correction package can have dependent corrections that contain objects of direct and indirect dependent correction requests and/or refer to correction instructions which can be functionally connected. In that regard, a dependency calculation can be performed to ensure that all relevant corrections are accounted for.

In some implementations, the customer support system 710 can include a dependency identifier component 735 that can control a process of preparing a list of correction requests and correction instructions to be included in the correction package. It can implement a correction identifier module 741 of final assembly system 706 to identify a list of transport orders which were either delivered in a previous support package and/or are available in an import buffer of current support package. This list of transport orders can be used as input for inclusion check. The correction system 702 can include a dependency calculator component 739 that can determine transport level dependencies. It can identify transports which have direct and indirect dependencies at the piece-list level and/or are also part of the inclusion list provided by correction identifier. The enhanced conflict check module 737 of customer support system 710 can identify correction instructions having technical dependencies as well as the functional level dependency. This can provide a list of correction instructions, which can be included in the correction package and a list of correction instructions, which can be referred from this correction package.

The process of dependency calculation can start in the customer support system 710 either by triggering a correction request and/or as part of exception handling. A correction package can be valid over a range of support packages. Thus, it is important that the correction package contain not only the objects of the leading (triggering) correction request but also objects of other needed corrections form given range of support packages, so that the customer can apply one correction package. For corrections belonging to other software components, dependency can be modeled.

The final assembly system 706 can provide the list of all transport orders of all support packages over which correction package will be valid. This list can be used as input for inclusion check. Thereafter, the correction system 702 can identify conflicting correction requests and the customer support system 710 can identify the correction instructions to be included and referred to in the correction package.

Figure 9:
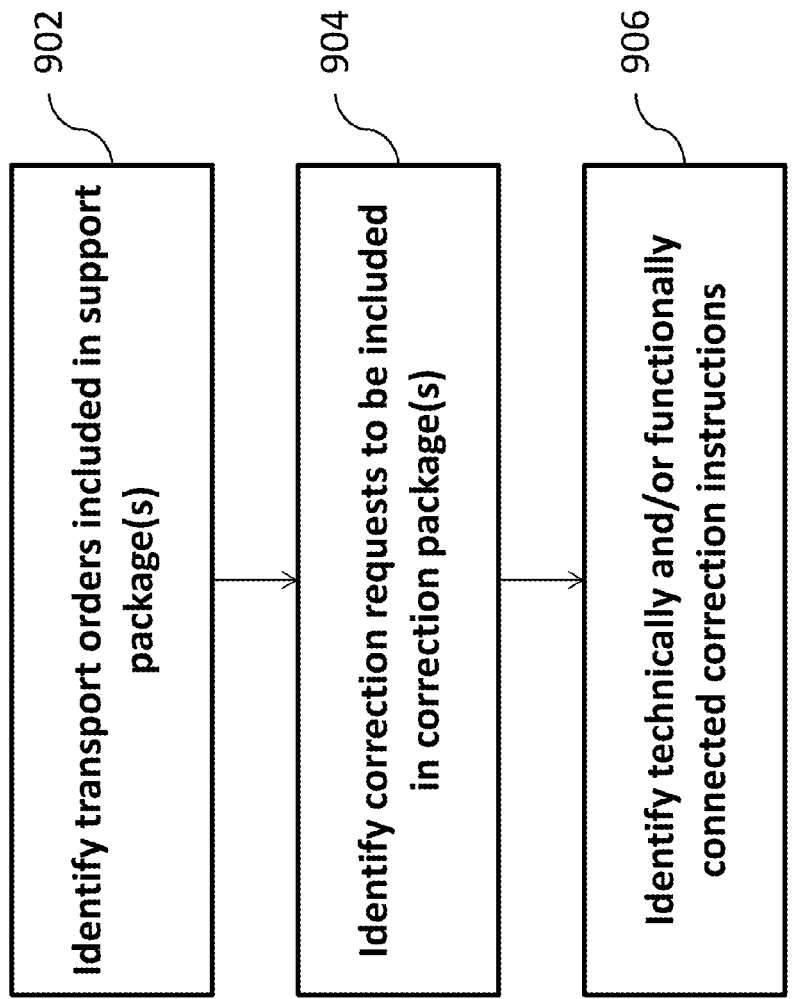
FIG. 9 illustrates an exemplary process for performing dependency calculation, according to some implementations of the current subject matter.

FIG. 9 illustrates an exemplary process 900 for performing dependency calculation, according to some implementations of the current subject matter. At 902, transport orders included in the support package(s) can be identified. The list of transport orders which are included in a given range of support packages over which the correction package will be valid can be obtained from final assembly system 706. For already released support packages, the information can be obtained from the software delivery composer 705, while for the current support package, the same can be obtained from an import buffer.

At 904, correction requests to be included in correction package(s) can be identified. The correction system 702 can be used to identify conflicting transport requests. The objects of the correction request (which triggered the correction package creation) can be identified. Using this object list, all previous correction requests which have direct and/or indirect object conflict can be identified. It is also possible that customer support system 710 can identify correction requests which are not having direct and indirect object conflict, which can be possible in case of functionally connected correction instructions. For those correction requests, the dependencies can be identified.

At 906, technically and/or functionally connected correction instructions can be identified. In the customer support system 710, an existing conflict check (or requirement check) functionality can be re-used to determine an indirect conflicting correction instruction as well as functionally connected correction instructions. Functionally connected correction instructions are instructions which do not have an object level conflict but can be added as pre-requisite correction instructions.

In some implementations, there can exist three different approaches to identify a list of correction requests and correction instructions to be included in the correction package and referred from the correction package. A first approach involves identification based on a corrective measure. In this approach, a list of correction requests identified from the correction system 702 can be used to find out containing corrective measure. Afterwards, from the identified corrective measures, a correction instruction can be selected which intersects with a required validity of the correction package. The correction instruction created without containing corrective measures will not be identified.

Another approach relates to identification based on a reference correction. Using this approach, the list of correction requests identified using the correction system 702 can be used to find all correction instructions which are/were created using the correction request as a reference correction, valid for the required correction package validity, and/or contained in the corrective measure with at-least one correction request which has same release as required by correction package validity. In some implementations, correction instructions can be created using multiple release validity. Even though for such corrections, correction requests can be available for all supported releases, only one correction instruction can be available spanning across all releases.

A further approach can relate to identification based on a conflict check. Conflict checks can find direct conflicts, i.e., correction instructions can be displayed in conflict if there are object and/or validity intersections. With enhanced conflict check, it can be possible to find out indirect conflicts. For all identified correction instructions, containing corrective measures can be identified. Within the identified corrective measures, all correction requests which correspond to the release of the correction package can be selected. Any correction request which is not in the list of correction requests identified from correction system can be again processed in the correction system 702 to determine further dependent corrections.

In some implementations, all correction instructions identified using the above three approaches can be used as input to determine functionally connected correction instructions. For such correction instructions, the required pre-requisites can be obtained. Any such correction instructions which are not part of the list of input correction instructions can be functionally connected. For all functionally connected correction instructions, containing corrective measures can be identified. Within those identified corrective measures, all correction requests which correspond to the release of the correction package can be selected. These correction requests can also be processed in the correction system 702 to determine further dependent corrections.

In some implementations, an output of dependency calculation process can result in at least one of the following: a list of correction instructions which are to be referred by the correction package, a list of correction instructions which are to be included in the correction package, and a list of objects which are to be included in the correction package.

Figure 8A:
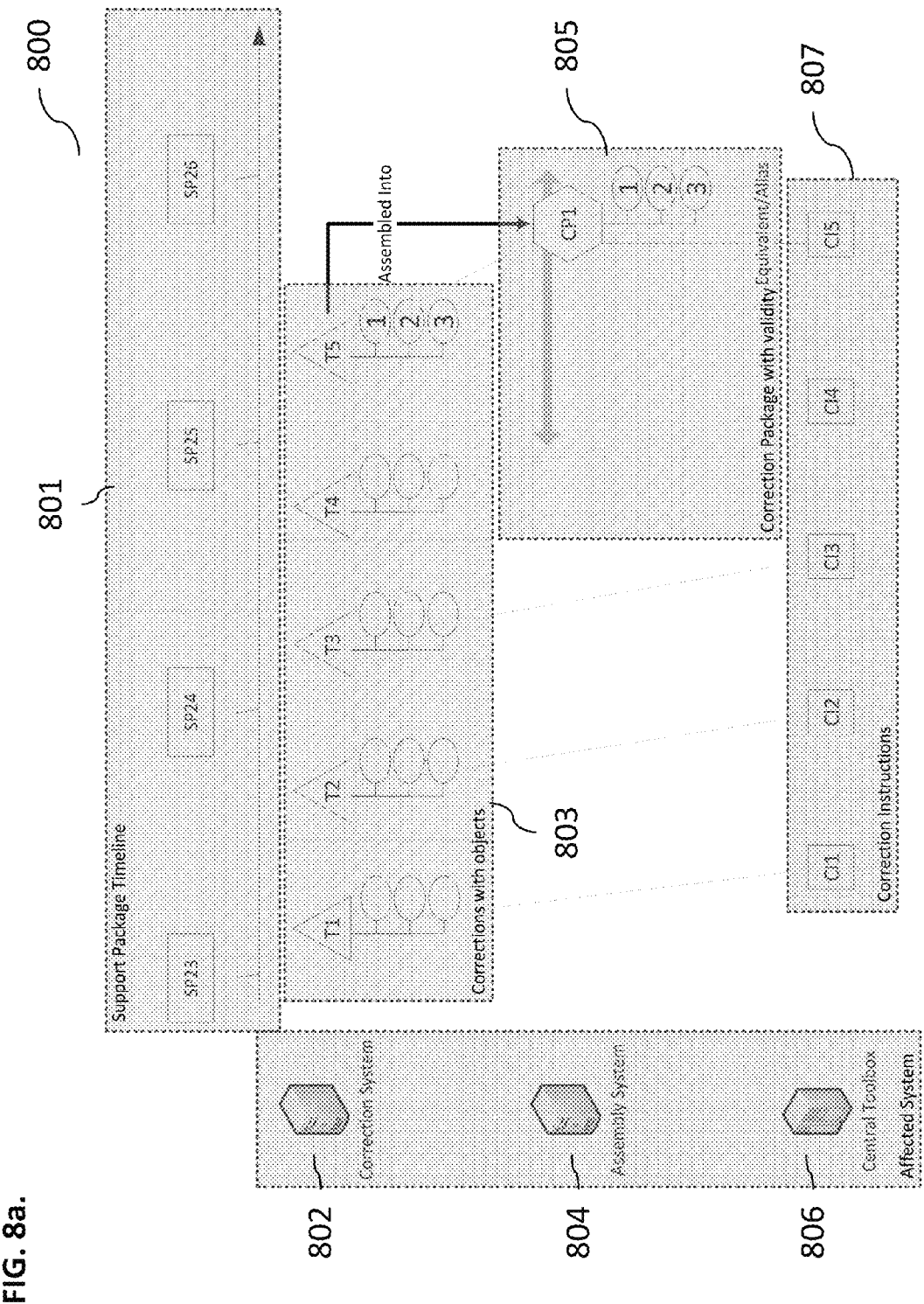
FIGS. 8a-8f illustrate exemplary dependency modeling, according to some implementations of the current subject matter.
Figure 8B:
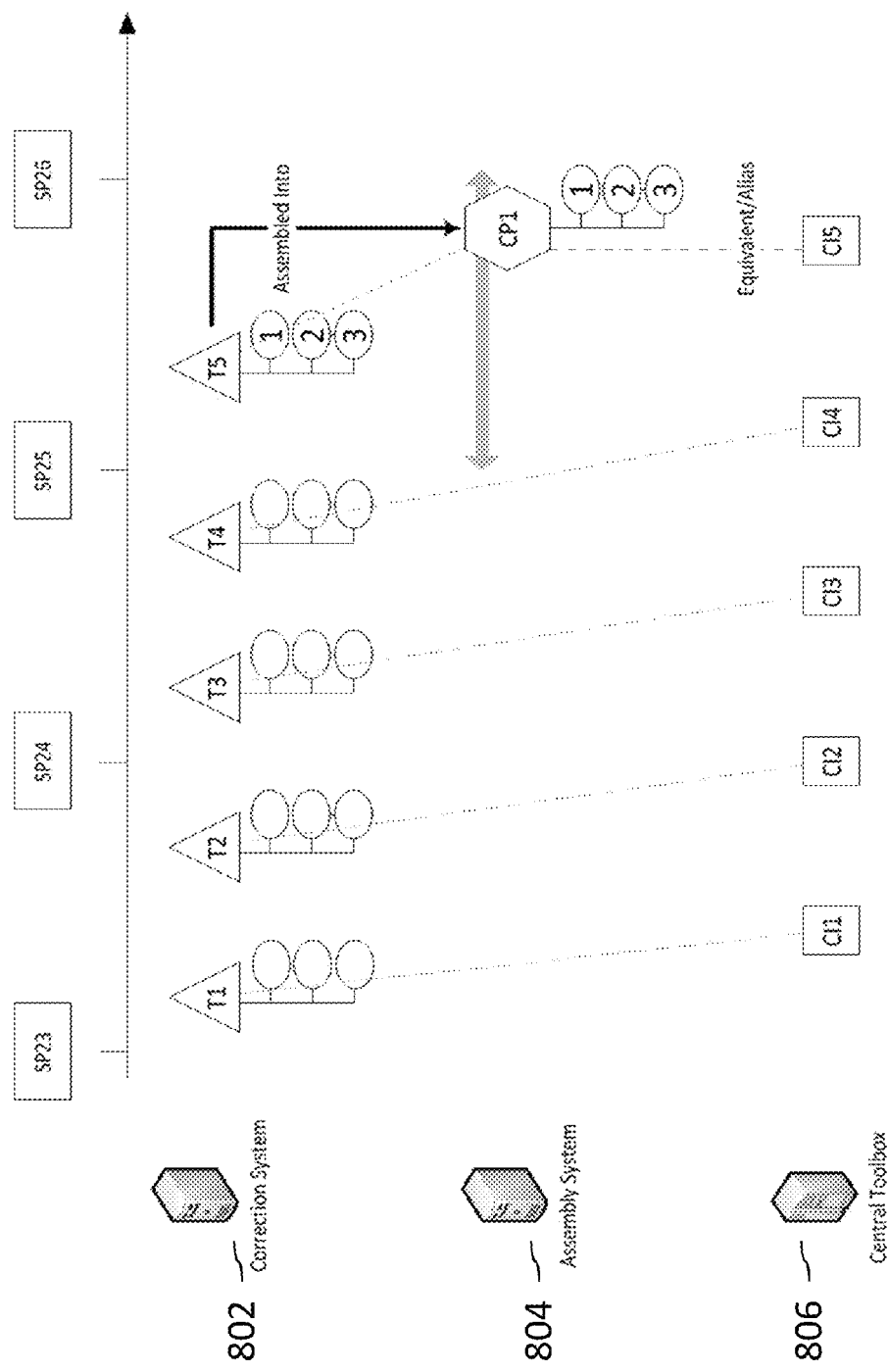
Figure 8C:
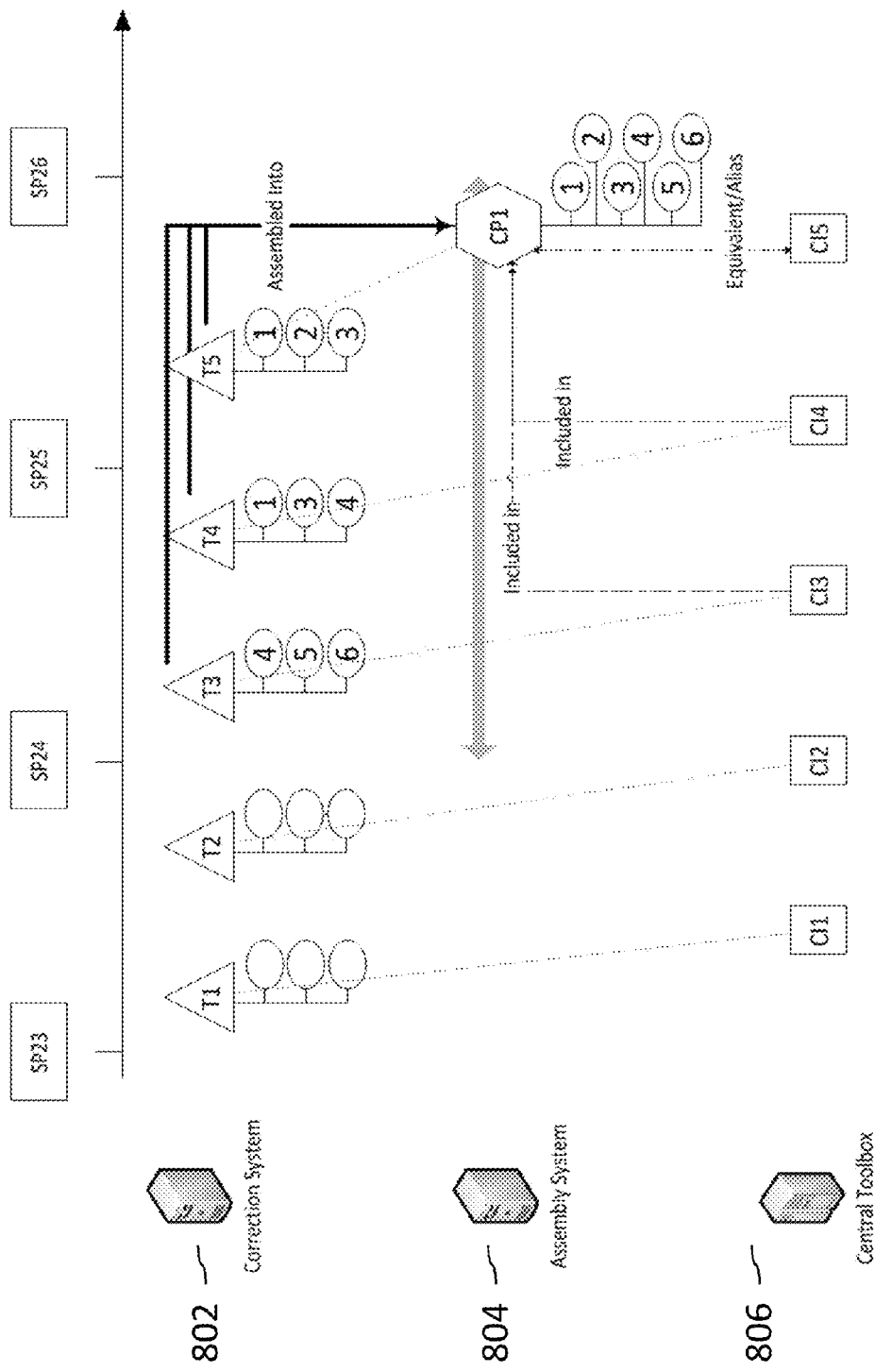
Figure 8D:
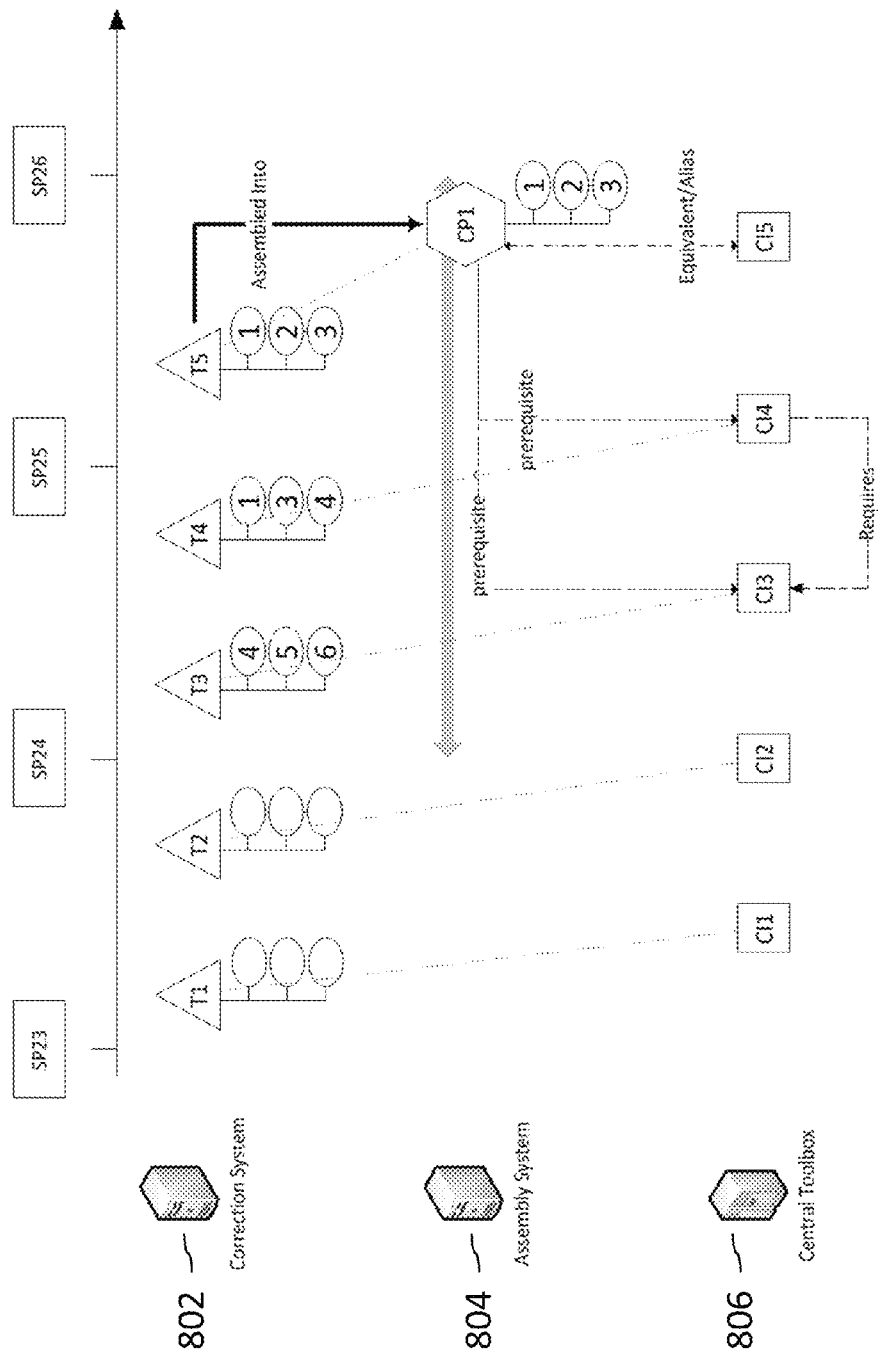
Figure 8E:
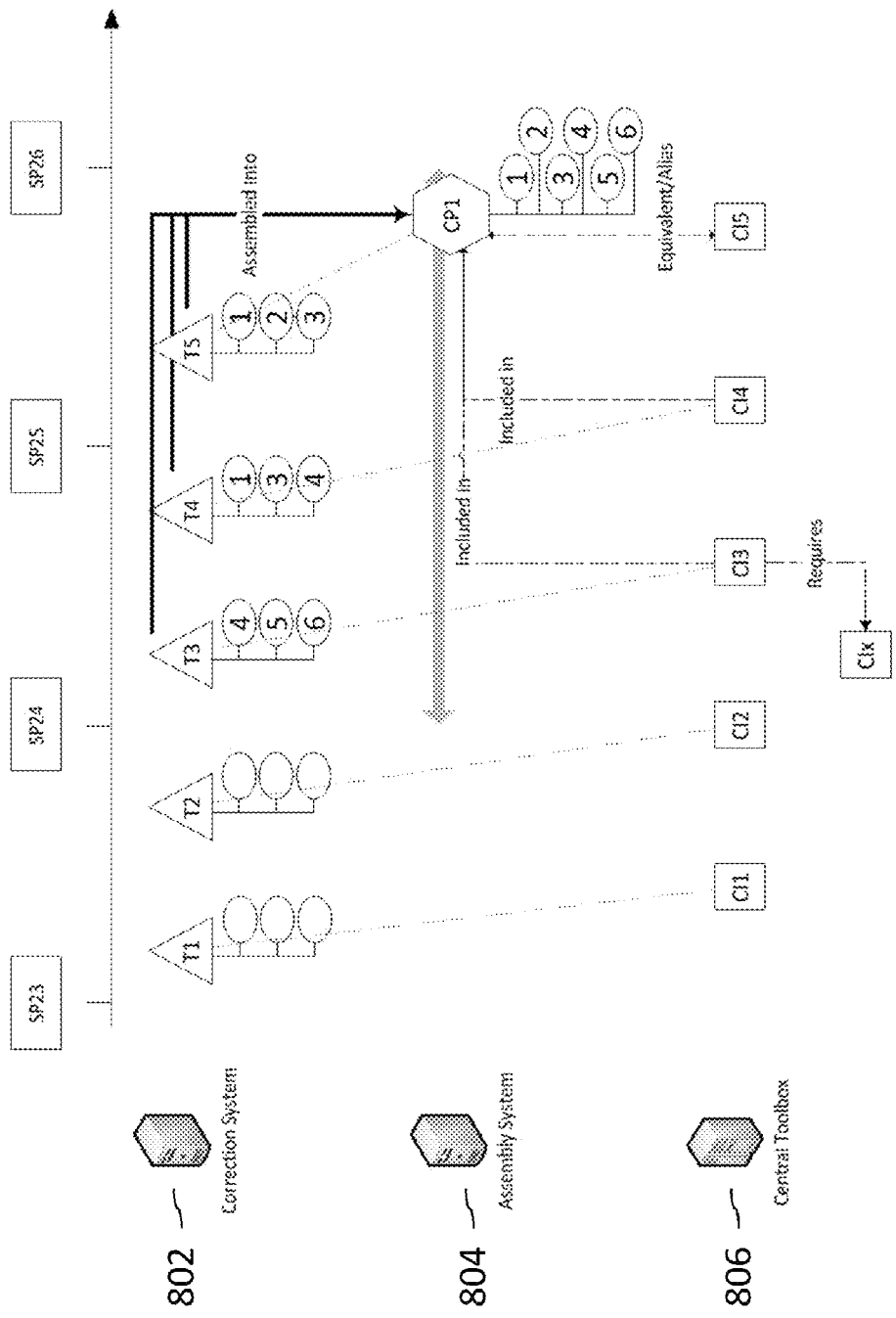
Figure 8F:
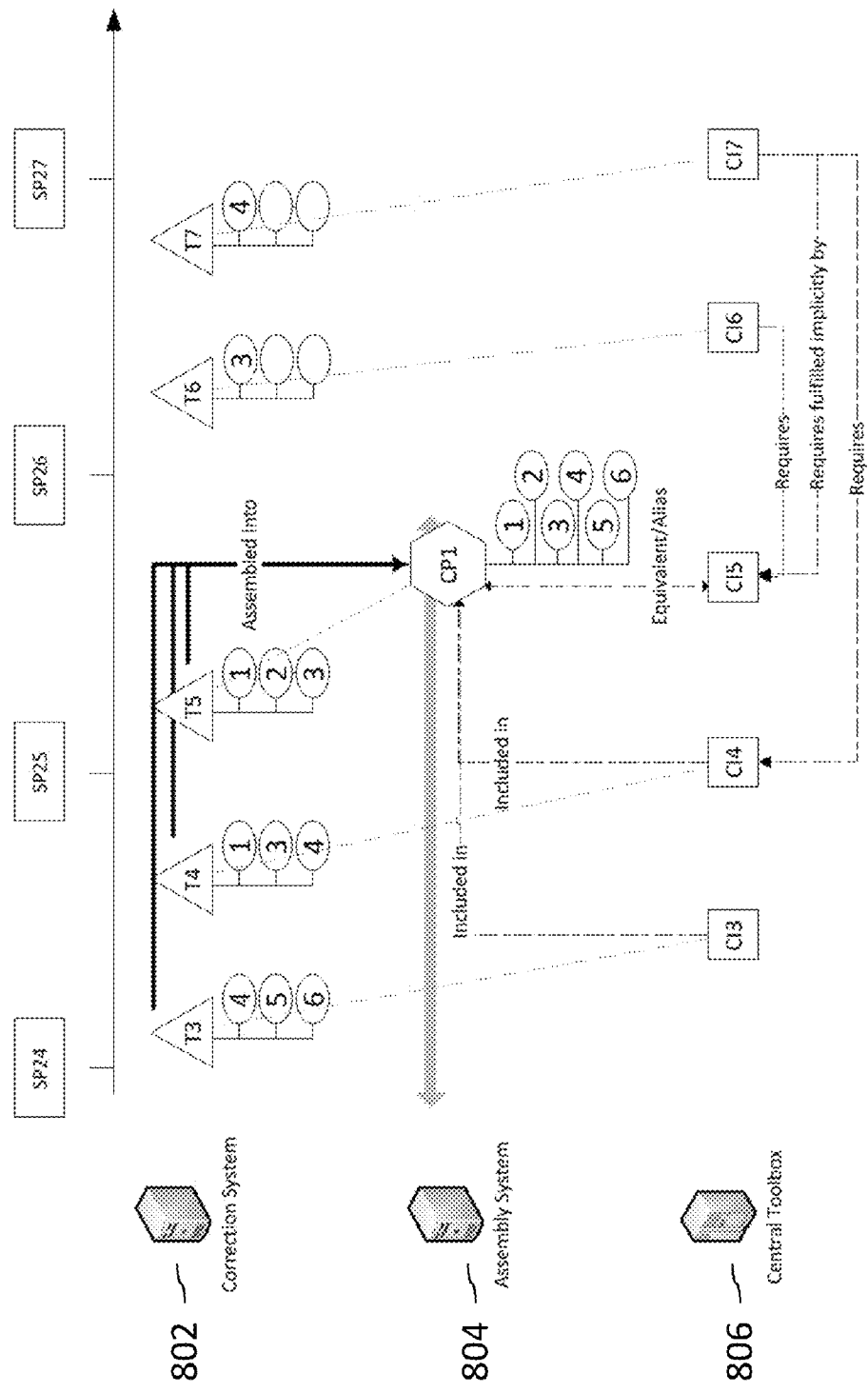
Figure 8G:
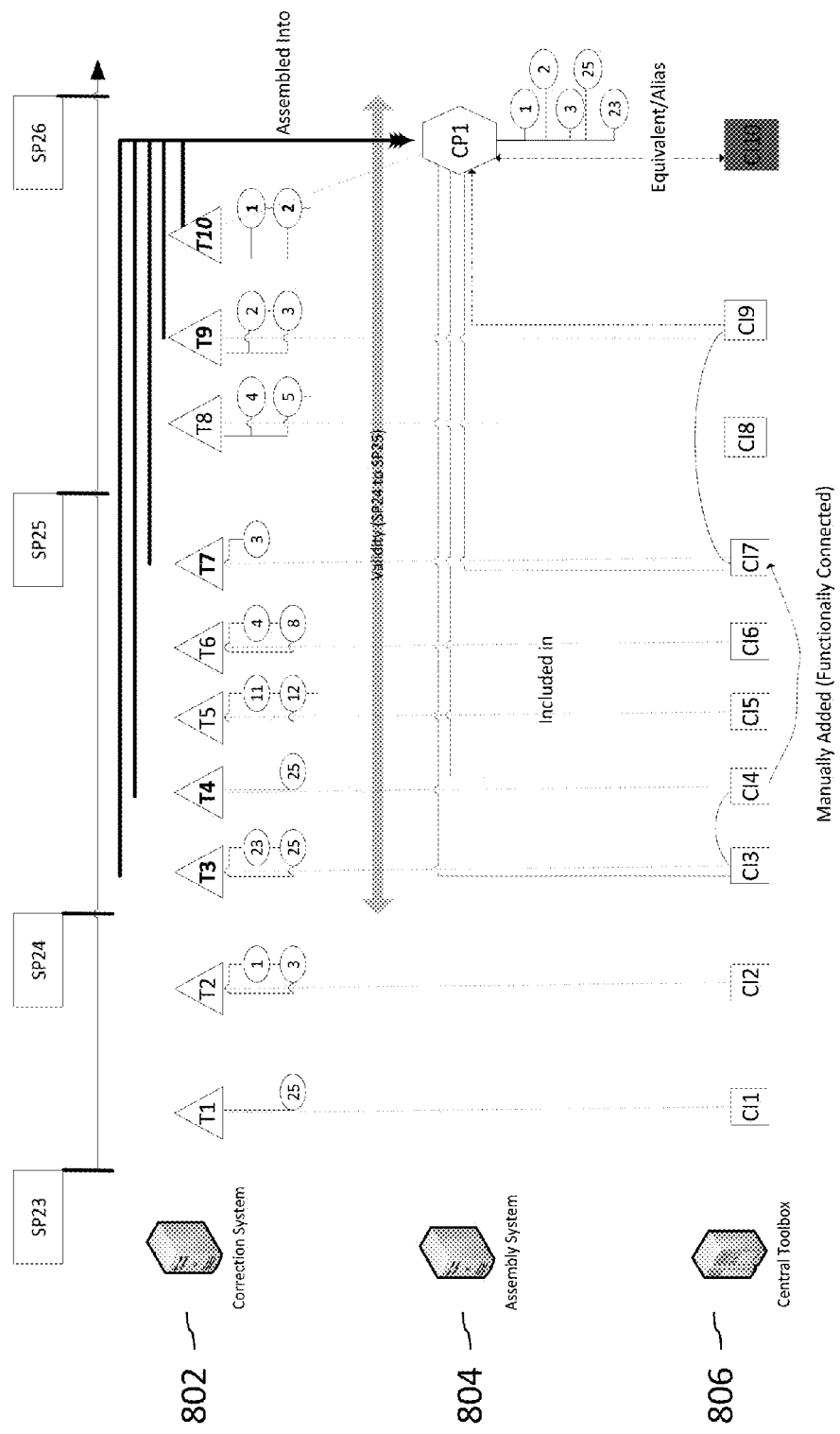
FIG. 8g illustrates an example of a dependency calculation, according to some implementations of the current subject matter.

FIG. 8g illustrates an example of a dependency calculation, according to some implementations of the current subject matter. As shown in FIG. 8, dependency calculation is being performed using a correction system 802 (similar to correction system 702 in FIG. 7), a final assembly system 804 (similar to the final assembly system 706 in FIG. 7), and a central toolbox 806 (which can be included in the customer support system 710 in FIG. 7).

As shown in FIG. 8g, support packages ("SP") 23, 24 and 25 can be already assembled and support package 26 can have a status 'In Process'. In FIG. 8g, support packages are shown by rectangles containing "SPxx" (where "xx" refers to a number of the support package); correction requests are shown by triangles; objects involved are shown by circles; and correction instructions are shown by square containing "CIx" (where "x" refers to a number of the correction instruction). The following table illustrates relationships between correction requests, corresponding objects involved and which support packages that include them along with corresponding correction instructions.

TABLE 1

Correction Requests.

| Correction Request | Objects Involved | Containing Support Package and CI |
|---|---|---|
| T1 | 25 | SP24 <C1> |
| T2 | 1, 3 | SP24 <C2> |
| T3 | 23, 25 | SP25 <C3> |
| T4 | 25 | SP25 <C4> |
| T5 | 11, 12 | SP25 <C5> |
| T6 | 4, 8 | SP25 <C6> |
| T7 | 3 | SP25 <C7> |

A state of import buffer of SP 26 can be illustrated in the following table.

TABLE 2

State of Import Buffer of SP 26

| Correction Request | Objects Involved | Containing Correction Instruction |
|---|---|---|
| T8 | 4, 5 | <C8> |
| T9 | 2, 3 | <C9> |
| T10 (Triggering correction request for correction package) | 1, 2 | Correction instruction <C10> will be created only after correction package creation |

For correction request T10, a correction package can be requested with validity over SP 24 to SP 25. Thus, any customer who is on support pack level 24 or 25 can apply the correction package.

During dependency calculation process, during identification of transport orders included in support packages (as shown by 902 in FIG. 9), all the transport orders included in SP 25 (correction package start validity+1) and all the transport order in the import buffer of SP 26 (correction package end validity+1) can be returned by final assembly system 804 as shown in FIG. 8g. Transport orders {T3, T4, T5, T6, T7, T8, T9 and T10} can be returned. This list of transport orders can be used to obtain the involved objects and inclusion check during identification of correction requests to be included in correction packages (as shown by 906 in FIG. 9) in the correction system 802. Objects [1, 2] can be identified during identification of objects involved in triggering transport request {T10}. Afterwards, all correction requests which have object intersection with objects [1, 2] and are in the list of support package transport orders {T3, T4, T5, T6, T7, T8, T9 and T10} can be identified. The result is {T9} with objects [2, 3]. Now, object [3] is a new object which was not there in the input object list [1, 2]. Thus, the loop can continue to determine all transports which can be included in the list of support package transport orders and have object intersection with [3]. Thus, this time the result is {T7} with object list [3]. Since the input and output object list for this iteration is same, the loop can terminate.

With identified correction requests {T9 and T7} and the complete objects list {1, 2, and 3} (all objects of T9, T7 and T10 as well), identification of technically and/or functionally connected correction instructions (as shown by 906 in FIG. 9) can be invoked. During this operation, technical conflicts can be detected using any of the three approaches discussed above. The approaches can be used to determine that for correction requests {T9 and T7} and object list {1, 2, and 3}, the identified correction instructions will be <C9 and C7>.

Now, a pre-requisite of correction instruction <C9 and C7> can be determined and <C4> as one of the pre-requisite can also be determined. The correction instruction can be functionally connected as it does not have any object level intersection. The correction request associated with this new CI <C4> is {T4}.

Identification of objects involved in triggering transport request can be performed for transport order {T4}. In this case, a new list of dependent correction request {T3} can be identified. Identification of technically and/or functionally connected correction instructions can use transport list {T3} and object list {23 and 25} to perform a conflict check. In this case, correction instruction <C3> can be identified as technical dependent and there is no functionally connected the correction instruction, thereby terminating the process.

As a result, the above process can generate: a list of transport orders {T10, T9, T7, T4 and T3} which should be included in the correction package, a list of objects [1, 2, 3, 23 and 25] and a list of included correction instruction <C9, C7, C4 and C3>.

FIGS. 8a-8f illustrate exemplary dependency modeling, according to some implementations of the current subject matter. Dependency modeling can determine which corrections can be integrated into a correction package, what are the other corrections in the validity range, how to integrate required correction instructions, and what happens if later corrections for the patched area occur.

FIG. 8a illustrates an exemplary system 800 that can be used for performing dependency modeling, according to some implementations of the current subject matter. Dependency modeling can be performed using the correction system 802 (similar to correction system 702 in FIG. 7), the final assembly system 804 (similar to the final assembly system 706 in FIG. 7), and the central toolbox 806 (which can be included in the customer support system 710 in FIG. 7). A support package timeline 801 (which includes support packages SP23, SP24, SP25, SP26) can provide information about creation time of the objects. The timeline can indicate a point in time when a particular support package is released to the customer.

The corrections that can be performed by the correction system 802 are illustrated in section 803, where triangle objects containing numbers (T1, T2, T3, T4, T5) indicate changed parts (1, 2, 3). The assembly system 804 can perform assembly of the correction package ("CP1"), represented by a hexagon object, which contains numbers indicating changed parts that were collected into the correction package SP1. A validity range of the correction package is indicative by the double headed arrow going through the correction package hexagon. Correction instructions (CI1, CI2, CI3, CI4, CI4, CI5) linked to the correction package are shown in section 807.

FIG. 8b illustrates an exemplary correction package without dependent corrections, according to some implementations of the current subject matter. Here, a correction package can be created without any other corrections in the same validity range. In this case, the correction package can be created with a validity range starting at beginning of support package SP25. In this validity range, only one correction exists: correction T5 containing objects 1, 2 and 3. Corrections T1-T4 are already contained in the support package SP25, and thus are not relevant. Hence, only correction T5 will be assembled into the correction package CP1. In the customer support system 710 (shown in FIG. 7), the correction instruction CI5 can be created linking to this correction package and can be assigned to the corresponding note.

FIG. 8c illustrates an exemplary correction package with dependent corrections, according to some implementations of the current subject matter. In this case, validity of the correction package can be prolonged to begin with support package SP24. In this validity period, other corrections can exist that are directly and/or indirectly relevant for the correction package. These are: correction T4 is directly connected, as it also changed the same objects (objects 1 & 3); and correction T3 is indirectly connected, as it changed same objects as T4 (object 4). As a result, all objects of both corrections T3 and T4 can be assembled into the correction package in order to allow a smooth installation on systems with SP24 or higher. As corrections T3 and T4 are assembled into the correction package, this also means that an implementation of the correction package automatically deploys the corrections of T3 and T4. Thus, the corresponding correction instructions CI3 and CI4 are also included and implemented via the correction package.

FIG. 8d illustrates an exemplary correction package with dependent correction instructions, according to some implementations of the current subject matter. In this case, correction instructions can be stated as prerequisites instead of assembling the corrections into the correction package. This means that even though the corrections T3 and T4 fall into the validity range of the correction package CP1, they are not assembled into the correction package. Instead, only the correction instructions CI3 and CI4 are added as required corrections to the correction instruction CI5 of the correction package. Further, it can be sufficient to only refer to correction instruction CI4 in this case, as that has correction instruction CI3 as a requirement. An implementation of the correction package in this case can involve the following process: first the required correction instructions can be implemented by the note assistant, and then the correction package can be implemented. This can be realized within one correction instruction queue during the implementation of correction instruction CI5. One of the advantages of this approach is that the correction package can act similar to a normal correction, so it only contains the current correction and requires other corrections to be implemented first. The correction package can be smaller and contain only the necessary objects, e.g., CI3 and CI4 are not required at all, if the correction package is implemented on SP25. If no correction instructions were created for correction T3 or T4, then the implementation of the correction package can lead to an inconsistent state and the correction package needs to be rejected or the SP range shortened. Also, in the first approach the correction package can bundle all changes including the corrections specified as manual corrections. Thus, it would not require any manual changes for the implementation of the T3 and T4 corrections.

FIG. 8e illustrates an exemplary correction instruction with external requirements, according to some implementations of the current subject matter. In this case, the included correction instruction CI3 can require an additional correction instruction CIx outside the patchable area. This can, for example, occur if a parallel correction of another software component is required for a fix. Then, this requirement may need to be taken over into the correction package, so that the note assistant can first implement the required correction instruction before implementing the correction package. Thus, the requirement valid for a correction instruction can be also valid for a correction package that includes the correction instruction.

FIG. 8f illustrates an exemplary corrections requiring included corrections and/or correction package, according to some implementations of the current subject matter. In this case, a later correction T6 that can change/correct object 3 which was part of the correction package CP1 can be included. As the object 3 is also contained in the correction T5 that was the basis of the correction package, the correction instruction CI6 can refer to the correction instruction CI5 of the correction package. Alternatively, a later correction T7 that can change and/or correct object 4 which was also part of the correction package CP1 can be provided. In this case, the referred object 4 was not changed by the correction T5 that was the basis of the correction package, it was only assembled into the correction package because its last correction T4 was done within the validity period of the correction package. Thus, it is not mandatory to refer to the correction instruction of the correction package. Instead, two options for the dependency declaration are possible: either the correction instruction CI7 refers to the correction instruction CI5 of the correction package as requirement; or it refers to the last correction instruction CI4 of the last correction instead. The second option can allow implementation of the correction instruction without implementing the correction package, only the implementation of correction instruction CI4 may be needed. On the other hand, the requirement is automatically fulfilled if the correction package was already implemented in the system, as it contains information that with it correction instructions CI3 and CI4 are also implemented.

Figure 10:
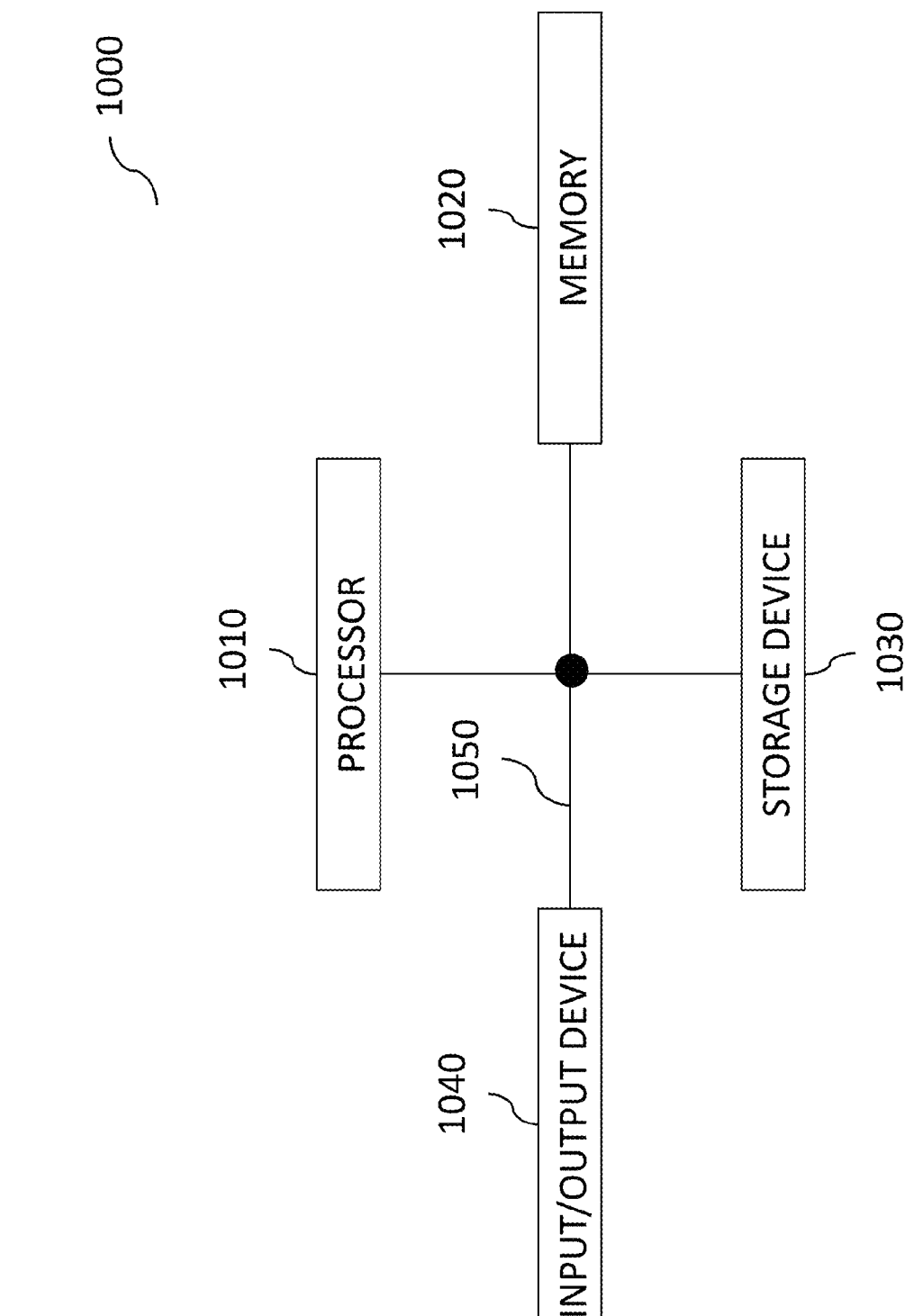
FIG. 10 is an exemplary system, according to some implementations of the current subject matter.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
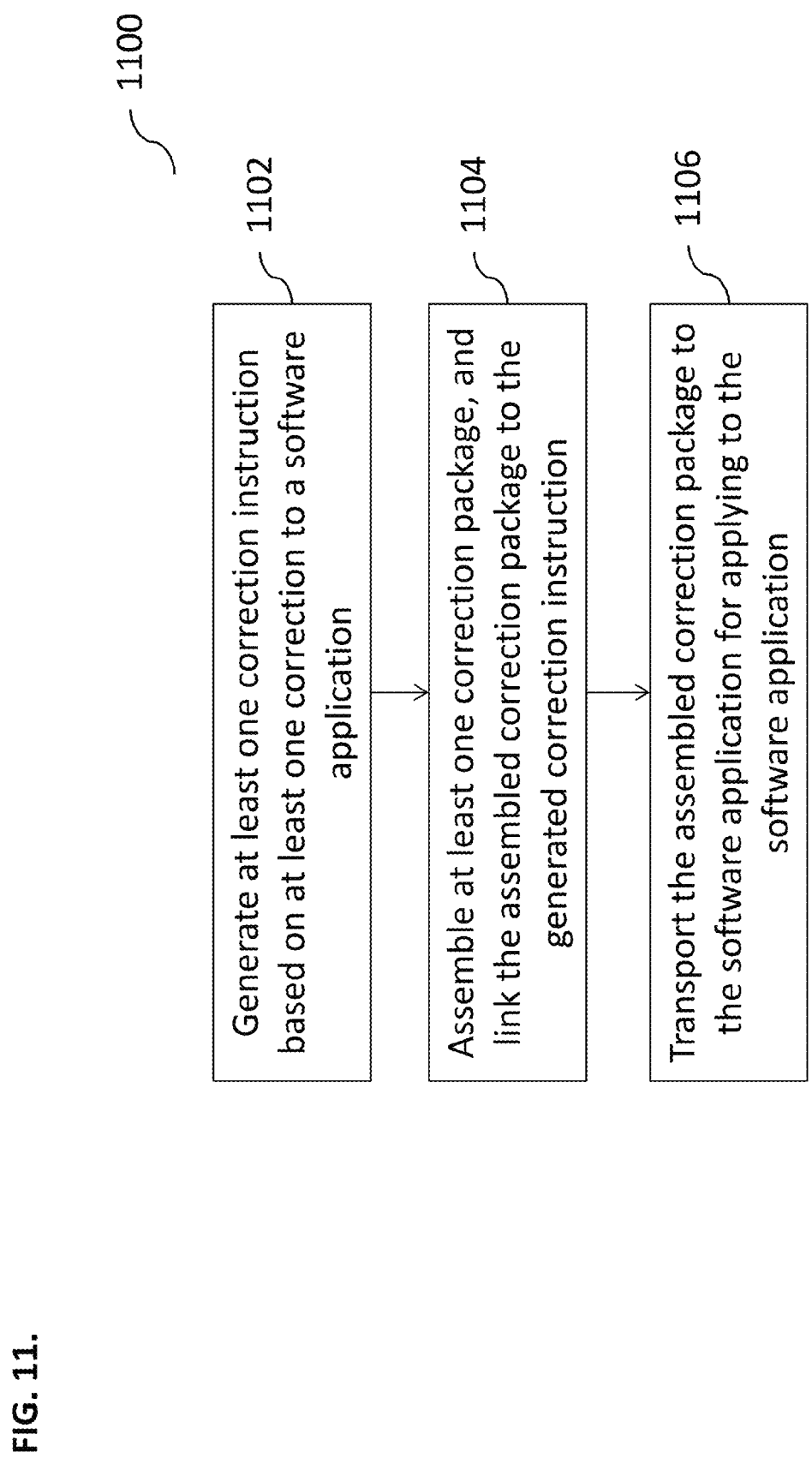
FIG. 11 is an exemplary method, according to some implementations of the current subject matter.

FIG. 11 illustrates an exemplary method 1100 for delivering a correction package, according to some implementations of the current subject matter. At 1102, at least one correction instruction can be generated based on at least one correction to the software application. At 1104, at least one correction package can be assembled. The correction package can also be linked to the generated correction instruction. At 1106, the assembled correction package can be transported to the software application for applying to the software application.

In some implementations, the current subject matter can include one or more of the following optional features. The correction package can include a plurality of corrections and corresponding correction instruction metadata. At least one correction instruction can be dependent on at least another correction instruction using at least one dependency. The dependency can include at least one of the following: a correction instruction being dependent on another correction instruction, a correction instruction being dependent on an external requirement of the software application, and a correction being dependent on at least one required correction for the software application In some implementations, the dependency can be determined by identifying a transport order included in at least one support package for the software application, identifying at least one correction request for the software application for inclusion in the correction package, and identifying at least one technically and/or functionally connected correction instruction.

In some implementations, the method can further include receiving a request for assembling the correction package from the software application, performing the assembling of the correction package, testing the assembled correction package, and releasing, based on the testing, the assembled correction packages for applying to the software application.

In some implementations, the correction package is assembled using an advanced business application programming.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
    generating at least one correction instruction based on at least one correction to a software application;

assembling at least one correction package, and linking the assembled at least one correction package to the generated at least one correction instruction; and transporting the assembled correction package to the software application for applying to the software application based on at least one transport level dependency generated based on the at least one assembled correction package, the at least one transport level dependency being determined based on at least one transport order having at least one of a direct dependency and an indirect dependency on at least another transport order in a list of transport orders, the list of transport orders being generated using a correction identifier, the correction identifier identifying a transport order contained in at least one of a previously delivered support package and a currently available support package associated with the at least one correction package;

wherein the correction package includes a plurality of corrections and corresponding correction instruction metadata, and at least one correction instruction is dependent on at least another correction instruction based on at least one dependency;

wherein the generating, the assembling, and the transporting are performed by at least one processor of at least one computing system.

2. The method according to claim 1, wherein the at least one dependency includes at least one of the following: a correction instruction being dependent on another correction instruction, a correction instruction being dependent on an external requirement of the software application, and a correction being dependent on at least one required correction for the software application.

3. The method according to claim 1, wherein the at least one dependency is determined by
identifying a transport order included in at least one support package for the software application;
identifying at least one correction request for the software application for inclusion in the correction package; and
identifying at least one technically and/or functionally connected correction instruction.

4. The method according to claim 1, further comprising
receiving a request for assembling the correction package from the software application;
performing the assembling of the correction package;
testing the assembled correction package; and
releasing, based on the testing, the assembled correction packages for applying to the software application.

5. The method according to claim 1, wherein the correction package is assembled using an advanced business application programming.

6. A system comprising:
at least one hardware programmable processor; and
a machine-readable medium storing instructions that, when executed by the at least one programmable processor, cause the at least one programmable processor to perform operations comprising:
generating at least one correction instruction based on at least one correction to a software application;
assembling at least one correction package, and linking the assembled at least one correction package to the generated at least one correction instruction; and
transporting the assembled correction package to the software application for applying to the software application based on at least one transport level dependency generated based on the at least one assembled correction package, the at least one transport level dependency being determined based on at least one transport order having at least one of a direct dependency and an indirect dependency on at least another transport order in a list of transport orders, the list of transport orders being generated using a correction identifier, the correction identifier identifying a transport order contained in at least one of a previously delivered support package and a currently available support package associated with the at least one correction package;

wherein the correction package includes a plurality of corrections and corresponding correction instruction metadata, and at least one correction instruction is dependent on at least another correction instruction based on at least one dependency.

7. The system according to claim 6, wherein the at least one dependency includes at least one of the following: a correction instruction being dependent on another correction instruction, a correction instruction being dependent on an external requirement of the software application, and a correction being dependent on at least one required correction for the software application.

8. The system according to claim 6, wherein the at least one dependency is determined by
identifying a transport order included in at least one support package for the software application;
identifying at least one correction request for the software application for inclusion in the correction package; and
identifying at least one technically and/or functionally connected correction instruction.

9. The system according to claim 6, wherein the operations further comprise
receiving a request for assembling the correction package from the software application;
performing the assembling of the correction package;
testing the assembled correction package; and
releasing, based on the testing, the assembled correction packages for applying to the software application.

10. The system according to claim 6, wherein the correction package is assembled using an advanced business application programming.

11. A computer program product comprising a non-transitory machine-readable medium storing instructions that, when executed by at least one programmable processor, cause the at least one programmable processor to perform operations comprising:
generating at least one correction instruction based on at least one correction to a software application;
assembling at least one correction package, and linking the assembled at least one correction package to the generated at least one correction instruction; and
transporting the assembled correction package to the software application for applying to the software application based on at least one transport level dependency generated based on the at least one assembled correction package, the at least one transport level dependency being determined based on at least one transport order having at least one of a direct dependency and an indirect dependency on at least another transport order in a list of transport orders, the list of transport orders being generated using a correction identifier, the correction identifier identifying a transport order contained in at least one of a previously delivered support package and a currently available support package associated with the at least one correction package;

wherein the correction package includes a plurality of corrections and corresponding correction instruction metadata, and at least one correction instruction is dependent on at least another correction instruction based on at least one dependency.

12. The computer program product according to claim 11, wherein the at least one dependency includes at least one of the following: a correction instruction being dependent on another correction instruction, a correction instruction being dependent on an external requirement of the software application, and a correction being dependent on at least one required correction for the software application.

13. The computer program product according to claim 11, wherein the at least one dependency is determined by
identifying a transport order included in at least one support package for the software application;
identifying at least one correction request for the software application for inclusion in the correction package; and
identifying at least one technically and/or functionally connected correction instruction.

14. The computer program product according to claim 11, wherein the operations further comprise
receiving a request for assembling the correction package from the software application;
performing the assembling of the correction package;
testing the assembled correction package; and
releasing, based on the testing, the assembled correction packages for applying to the software application.

* * * * *